(12) United States Patent
Hu et al.

(10) Patent No.: US 12,197,674 B2
(45) Date of Patent: Jan. 14, 2025

(54) ELECTRONIC DEVICE, CONTROL METHOD FOR ELECTRONIC DEVICE, TOUCH SYSTEM, AND CHIP SYSTEM

(71) Applicant: Huawei Technologies Co., Ltd., Shenzhen (CN)

(72) Inventors: Zhengyuan Hu, Xi'an (CN); Fengxin Wang, Xi'an (CN); Jiacong Zhang, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/247,120

(22) PCT Filed: Sep. 14, 2021

(86) PCT No.: PCT/CN2021/118240
§ 371 (c)(1),
(2) Date: Mar. 29, 2023

(87) PCT Pub. No.: WO2022/068574
PCT Pub. Date: Apr. 7, 2022

(65) Prior Publication Data
US 2023/0367421 A1    Nov. 16, 2023

(30) Foreign Application Priority Data

Sep. 30, 2020 (CN) .......................... 202011063748.8

(51) Int. Cl.
G06F 3/041 (2006.01)
G06F 3/042 (2006.01)
G06F 3/044 (2006.01)

(52) U.S. Cl.
CPC ........ G06F 3/04166 (2019.05); G06F 3/0421 (2013.01); G06F 3/0446 (2019.05);
(Continued)

(58) Field of Classification Search
CPC .. G06F 3/04166; G06F 3/0421; G06F 3/0446; G06F 3/0448; G06F 3/0443;
(Continued)

(56) References Cited

U.S. PATENT DOCUMENTS 9,760,213 B2 * 9/2017 Kim ...................... G06F 3/0412
10,395,084 B2 * 8/2019 Lee ..................... G06V 40/1306
(Continued)

FOREIGN PATENT DOCUMENTS

EP       3637236 A1    4/2020
WO    2018201460 A1   11/2018

*Primary Examiner* — Michael J Jansen, II
(74) *Attorney, Agent, or Firm* — Slater Matsil, LLP

(57) ABSTRACT

A touch detection drive circuit in an electronic device inputs a touch excitation signal to a touch electrode, and receives a detection signal of the touch electrode. An isolation power supply circuit receives the touch excitation signal and a primary power supply voltage; based on the touch excitation signal in a non-touch detection phase, short-circuits a first reference ground and a second reference ground, stores the primary power supply voltage, and transmits the primary power supply voltage to the touch detection drive circuit; and in a touch detection phase, disconnects the first reference ground from the second reference ground and discharges to the touch detection drive circuit.

19 Claims, 24 Drawing Sheets

(52) U.S. Cl.
CPC .......... *G06F 3/0448* (2019.05); *G06F 3/0443* (2019.05); *G06F 3/0445* (2019.05); *G06F 2203/04108* (2013.01)

(58) Field of Classification Search
CPC ......... G06F 3/0445; G06F 2203/04108; G06F 3/0416; G06F 3/0418
See application file for complete search history.

(56) References Cited

U.S. PATENT DOCUMENTS

| | | | | |
|---|---|---|---|---|
| 10,627,950 B2* | 4/2020 | Jiang | .................... | G06F 3/04166 |
| 10,691,259 B2* | 6/2020 | Kim | .................... | G06F 3/016 |
| 10,788,929 B2* | 9/2020 | Shin | .................... | G06F 3/0412 |
| 10,871,852 B2* | 12/2020 | Kim | .................... | G06F 3/0412 |
| 10,921,158 B2* | 2/2021 | Wang | .................... | H03K 3/012 |
| 11,960,677 B2* | 4/2024 | Takada | .................... | G06F 3/0412 |
| 11,977,700 B2* | 5/2024 | Hu | .................... | G06F 3/04166 |
| 12,027,120 B2* | 7/2024 | Kang | .................... | G09G 3/3233 |
| 2017/0102825 A1* | 4/2017 | Kim | .................... | G06F 3/04166 |
| 2018/0210606 A1* | 7/2018 | Jiang | .................... | G06F 3/04166 |
| 2019/0025091 A1* | 1/2019 | Wang | .................... | H03K 3/012 |
| 2019/0065000 A1* | 2/2019 | Kim | .................... | G09G 3/2092 |
| 2019/0079631 A1* | 3/2019 | Kim | .................... | G06F 3/04166 |
| 2019/0102591 A1* | 4/2019 | Lee | .................... | G06F 3/0443 |
| 2020/0019270 A1* | 1/2020 | Shin | .................... | G06F 1/3262 |
| 2022/0283689 A1* | 9/2022 | Takada | .................... | G06F 3/0412 |
| 2023/0087831 A1* | 3/2023 | Kang | .................... | G06F 3/04164 345/76 |
| 2023/0367421 A1* | 11/2023 | Hu | .................... | G06F 3/0448 |
| 2024/0019957 A1* | 1/2024 | Hu | .................... | G06F 3/0416 |

* cited by examiner

ELECTRONIC DEVICE, CONTROL METHOD FOR ELECTRONIC DEVICE, TOUCH SYSTEM, AND CHIP SYSTEM

CROSS-REFERENCE TO RELATED APPLICATIONS

This is a National Stage of International Patent Application No. PCT/CN2021/118240 filed on Sep. 14, 2021, which claims priority to Chinese Patent Application No. 202011063748.8 filed on Sep. 30, 2020. Both of the aforementioned applications are hereby incorporated by reference in their entireties.

TECHNICAL FIELD

This application relates to the field of touch technologies, and in particular, to an electronic device, a control method for an electronic device, a touch system, and a chip system.

BACKGROUND

When a touchscreen uses a floating touch technology, a finger of a user does not need to contact the touchscreen, and only needs to perform a hover operation, a tap operation, or a slide operation on the touchscreen to perform a touch operation on an electronic device. Currently, a capacitive touch detection technology may be employed to implement hovering touch. In this case, touch detection can be implemented by detecting a change of a capacitor formed when a touch electrode in the touchscreen approaches the finger of the user.

In a hovering touch process, a larger distance between the finger of the user and the touch electrode indicates a smaller value of the capacitor formed between the finger of the user and the touch electrode. Generally, a distance between the finger of the user and the touch electrode needs to be less than or equal to a detection range applicable to hovering touch, for example, 5 mm. In this case, a variation of the foregoing capacitor can be effectively detected. When the distance between the finger of the user and the touch electrode exceeds 5 mm, because the capacitor has a very small value, precision of data obtained through touch detection is very low. As a result, touch detection cannot be implemented.

SUMMARY

This application provides an electronic device, a control method for an electronic device, a touch system, and a chip system, to increase a detection range applicable to hovering touch.

To achieve the foregoing objective, the following technical solutions are used in this application.

According to one aspect of this application, an electronic device is provided. The electronic device includes a touch electrode, a touch detection drive circuit, a first reference ground, a second reference ground, an isolation power supply circuit, and an alternating current amplification circuit. The touch detection drive circuit is electrically connected to the touch electrode and the second reference ground. The touch detection drive circuit is configured to: in a sampling period, input a touch excitation signal to the touch electrode and receive a detection signal of the touch electrode. The touch excitation signal includes a touch detection phase and a non-touch detection phase in the sampling period. The isolation power supply circuit is electrically connected to the touch detection drive circuit, the first reference ground, and the second reference ground. The isolation power supply circuit is configured to: receive the touch excitation signal and a primary power supply voltage; based on the touch excitation signal in the non-touch detection phase, short-circuit the first reference ground and the second reference ground, store the primary power supply voltage, and transmit the primary power supply voltage to the touch detection drive circuit; and in the touch detection phase, disconnect the first reference ground from the second reference ground and discharge to the touch detection drive circuit. The alternating current amplification circuit is electrically connected to the second reference ground and the first reference ground, and the alternating current amplification circuit is configured to: receive and amplify the touch excitation signal to generate a voltage regulation signal, and transmit the voltage regulation signal to the second reference ground. A peak-to-peak value of the voltage regulation signal is greater than a voltage value of the first reference ground. In view of the above, the isolation power supply circuit may short-circuit the first reference ground and the second reference ground in the non-touch detection phase, so that a power supply for providing the primary power supply voltage is electrically connected to the touch drive detection circuit, to drive the touch drive detection circuit to output the touch excitation signal. The isolation power supply circuit may disconnect the first reference ground from the second reference ground in the touch detection phase, so that the power supply for providing the primary power supply voltage is isolated from the touch drive detection circuit, and discharges a power stored in the isolation power supply circuit to the touch drive detection circuit, to drive the touch drive detection circuit to output the touch excitation signal. In this way, after power-on, the isolation power supply circuit can enable the touch drive detection circuit to be always in a working state. In addition, after the first reference ground is disconnected from the second reference ground, to enable a peak-to-peak voltage value of the second reference ground to be greater than the voltage value of the first reference ground, the alternating current amplification circuit may be electrically connected to the second reference ground. In a working process, the alternating current amplification circuit may be configured to: receive and amplify the touch excitation signal to generate the voltage regulation signal, and transmit the voltage regulation signal to the second reference ground. The peak-to-peak value of the voltage regulation signal may be greater than the voltage value of the first reference ground. In this case, in the touch phase, when a finger performs hovering touch, an equivalent capacitor is formed between the finger equivalent to the first reference ground and the touch electrode. A voltage difference between two electrode plates of the equivalent capacitor is relatively large. Therefore, an electrical signal used to detect a charge/discharge time of the equivalent capacitor is amplified, thereby increasing resolution of signal detection of the equivalent capacitor. In addition, a voltage difference between two electrode plates (the touch electrode and the second reference ground) of a parasitic capacitor is relatively small. Therefore, a ratio of noise generated by the parasitic capacitor to a detection signal obtained by detecting a charge/discharge process of the equivalent capacitor is relatively small, so that a signal-to-noise ratio of touch detection can be increased, thereby facilitating implementation of hovering touch.

Optionally, the isolation power supply circuit includes a signal conversion circuit, a first energy storage circuit, a first switch circuit, and a second switch circuit. The signal conversion circuit is configured to: receive the touch excitation signal, and filter out a high frequency signal in the touch phase in the touch excitation signal to generate a sampling signal. The first energy storage circuit is electrically connected to the touch detection drive circuit and is configured to: store the primary power supply voltage in the non-touch phase, and discharge to the touch detection drive circuit in the touch detection phase. A control end of the first switch circuit is electrically connected to the signal conversion circuit, a first end of the first switch circuit is electrically connected to the first reference ground, and a second end of the first switch circuit is electrically connected to the second reference ground. The first switch circuit is configured to: under control of the sampling signal, short-circuit the first reference ground and the second reference ground in a conducting state in the non-touch detection phase, and disconnect the first reference ground from the second reference ground in a cut-off state in the touch detection phase. A control end of the second switch circuit is electrically connected to the signal conversion circuit, a first end of the second switch circuit is configured to receive the primary power supply voltage, and a second end of the second switch circuit is electrically connected to the first energy storage circuit. The second switch circuit is configured to: under control of the sampling signal, transmit the received primary power supply voltage to the first energy storage circuit and the touch detection drive circuit in a conducting state in the non-touch detection phase, and enable the first energy storage circuit to discharge in a cut-off state in the touch detection phase. A waveform of the sampling signal generated by the signal conversion circuit may be the same as or opposite to a waveform of a low frequency part of the touch excitation signal. In this way, in the non-touch detection phase, both the first switch circuit and the second switch circuit are conducted under control of the sampling signal. The first reference ground and the second reference ground are short-circuited by using the first switch circuit, and the primary power supply voltage is transmitted to the first energy storage circuit and the touch detection drive circuit by using the second switch circuit. The touch detection drive circuit is in a working state, so that the touch excitation signal can be output. The first energy storage circuit stores the primary power supply voltage. In the touch detection phase, both the first switch circuit and the second switch circuit are cut off under control of the sampling signal. The first reference ground and the second reference ground are disconnected, the first energy storage circuit discharges to the touch detection drive circuit, and the touch detection drive circuit is grounded through the second reference ground and is in a working state to continuously output the touch excitation signal.

Optionally, the signal conversion circuit includes a diode, a second energy storage circuit, and a third switch circuit. An input end of the diode is configured to receive the touch excitation signal. The second energy storage circuit is electrically connected to an output end of the diode and the first reference ground, and may receive the touch excitation signal. A control end of the third switch circuit is electrically connected to the output end of the diode and the second energy storage circuit, a first end of the third switch circuit is electrically connected to the first reference ground, and a second end of the third switch circuit is electrically connected to a first voltage end, the first switch circuit, and the second switch circuit. The third switch circuit is configured to: disconnect the control end of the first switch circuit and the control end of the second switch circuit from the first reference ground and transmit a voltage of the first voltage end to the control end of the first switch circuit and the control end of the second switch circuit in a cut-off state in the non-touch detection phase. The third switch circuit is further configured to short-circuit the control end of the first switch circuit and the control end of the second switch circuit to the first reference ground in a conducting state in the touch detection phase. In this way, in the touch detection phase, when the touch excitation signal is at a high level, the high level is transmitted to the control end of the third switch circuit through the diode, to control the third switch circuit to be conducted, so that the first voltage end and the first reference ground are short-circuited, and the sampling signal may be at a low level in this case. In addition, in a process in which the touch excitation signal decreases from a high level to a low level, the second energy storage circuit may keep the third switch circuit to be conducted. In the touch detection phase, a frequency of the touch excitation signal is very high. Therefore, before discharging of the second energy storage circuit ends, the touch excitation signal quickly changes from a low level to a high level, so that the third switch circuit continues to be conducted. In this way, in the entire touch detection phase, the sampling signal remains at a low level. In the non-touch detection phase, when the touch excitation signal is at a low level, the low level is transmitted to the control end of the third switch circuit through the diode, to control the third switch circuit to be cut off. In this case, a high level output by the first voltage end is output as a sampling signal. In this way, the waveform of the obtained sampling signal is opposite to the waveform of the low frequency part of the touch excitation signal.

Optionally, the signal conversion circuit further includes a phase inverter. The phase inverter is electrically connected between the second end of the third switch circuit and the control end of the first switch circuit. The phase inverter is further electrically connected between the second end of the third switch circuit and the control end of the second switch circuit. Under a reverse action of the phase inverter, the waveform of the sampling signal may be the same as the waveform of the low frequency part of the touch excitation signal.

Optionally, the signal conversion circuit includes a diode, a second energy storage circuit, and a logic control circuit. An input end of the diode is configured to receive the touch excitation signal. The second energy storage circuit is electrically connected to an output end of the diode and the first reference ground. An input end of the logic control circuit is electrically connected to the output end of the diode and the second energy storage circuit, an output end of the logic control circuit is electrically connected to the control end of the first switch circuit and the control end of the second switch circuit, and a logic control end of the logic control circuit is electrically connected to a second voltage end. In the non-touch detection phase, a voltage received by the logic control circuit is less than a voltage of the second voltage end, and the logic control circuit is configured to input a low level to the first switch circuit and the second switch circuit; and in the touch detection phase, a voltage received by the logic control circuit is greater than or equal to a voltage of the second voltage end, and the logic control circuit is configured to input a high level to the first switch circuit and the second switch circuit. In this way, the waveform of the obtained sampling signal is the same as the waveform of the low frequency part of the touch excitation signal.

Optionally, the first energy storage circuit includes a battery, or includes at least one of a capacitor and an inductor.

Optionally, the electronic device further includes a first isolation element. The first isolation element is coupled between the touch detection drive circuit and the alternating current amplification circuit and between the touch detection drive circuit and the isolation power supply circuit. The first isolation element is configured to couple the touch excitation signal to the alternating current amplification circuit and the isolation power supply circuit. The touch detection circuit is electrically connected to the second reference ground, and the isolation power supply circuit and the alternating current amplification circuit are electrically connected to the first reference ground. In this way, through the first isolation element, a signal can be transmitted between circuits electrically connected to different reference grounds.

Optionally, the first isolation element includes a light emitting device and an optical-to-electrical converter. The light emitting device is electrically connected to the touch detection drive circuit and is configured to convert the touch excitation signal from the touch detection drive circuit into an optical signal. The optical-to-electrical converter is electrically connected to the alternating current amplification circuit and the isolation power supply circuit and is configured to convert the optical signal into an electrical signal and transmit the electrical signal to the alternating current amplification circuit and the isolation power supply circuit. In this case, the first isolation element performs signal coupling transmission through optical coupling.

Optionally, the first isolation element includes a signal input interface, a signal output interface, and an isolation capacitor. The signal input interface is electrically connected to the touch detection drive circuit and is configured to receive the touch excitation signal from the touch detection drive circuit. The signal output interface is electrically connected to the alternating current amplification circuit and the isolation power supply circuit. A first end of the isolation capacitor is electrically connected to the signal input interface, and a second end of the isolation capacitor is electrically connected to the signal output interface. The isolation capacitor is configured to transmit the touch excitation signal from the signal input interface to the signal output interface. In this case, the first isolation element performs signal coupling transmission through capacitive coupling.

Optionally, the first isolation element includes an acoustic device and an acoustic-to-electric converter. The acoustic device is electrically connected to the touch detection drive circuit and is configured to convert the touch excitation signal from the touch detection drive circuit into a sound signal. The acoustic-to-electric converter is electrically connected to the alternating current amplification circuit and the isolation power supply circuit and is configured to convert the sound signal into an electrical signal and transmit the electrical signal to the alternating current amplification circuit and the isolation power supply circuit. In this case, the first isolation element performs signal coupling transmission through sound coupling.

Optionally, the alternating current amplification circuit includes an operational amplifier, a first capacitor, a first resistor, a second capacitor, and a second resistor. An output end of the operational amplifier is electrically connected to the second reference ground, and a control end is electrically connected to a voltage control end. A first end of the first capacitor is electrically connected to the touch detection drive circuit, and a second end of the first capacitor is electrically connected to a positive input end of the operational amplifier. A first end of the first resistor is electrically connected to a negative input end of the operational amplifier. A first end of the second capacitor is electrically connected to a second end of the first resistor, and a second end of the second capacitor is electrically connected to the first reference ground. A first end of the second resistor is electrically connected to the negative input end of the operational amplifier, and a second end of the second resistor is electrically connected to the output end of the operational amplifier. In this way, the first resistor (with a resistance value of R1), the second resistor (with a resistance value of R2), and the second capacitor may form an alternating current amplification unit, the alternating current amplification unit can amplify a peak-to-peak voltage value of the touch excitation signal transmitted to the positive input end of the operational amplifier through the first capacitor to R2/R1 times. Therefore, a peak-to-peak voltage value at the output end of the operational amplifier can be close to a full scale of operational amplifying of the operational amplifier (that is, a voltage value of the voltage control end). In this way, a voltage of the second reference ground can be raised.

Optionally, the alternating current amplification circuit further includes a third resistor and a fourth resistor. A first end of the third resistor is electrically connected to the voltage control end, and a second end of the third resistor is electrically connected to the positive input end of the operational amplifier. A first end of the fourth resistor is electrically connected to the positive input end of the operational amplifier, and a second end of the fourth resistor is electrically connected to the first reference ground. A resistance value of the third resistor is the same as that of the fourth resistor. Under a voltage division action of the third resistor and the fourth resistor, a center bias voltage may be generated at a center bias point. In this way, the first resistor, the second resistor, and the second capacitor form the alternating current amplification unit, so that the peak-to-peak voltage value of the touch excitation signal can be stably amplified.

Optionally, the electronic device further includes a processor and a second isolation element. The processor is electrically connected to the first reference ground, and the second isolation element is coupled between the processor and the touch detection drive circuit. The second isolation element is configured to: couple, to the touch detection drive circuit, a control signal that is output by the processor, and couple a touch detection result obtained by the touch detection drive circuit to the processor. The processor is electrically connected to the first reference ground, and the touch detection drive circuit is electrically connected to the second reference ground. In this way, through the second isolation element, a signal can be transmitted between circuits electrically connected to different reference grounds.

Optionally, the electronic device further includes a battery, a first PMU, and a second PMU. The first PMU is electrically connected to the battery and the first end of the second switch circuit. The first PMU is configured to convert a battery voltage of the battery into the primary power supply voltage and transmit the primary power supply voltage to the first end of the second switch circuit. The second PMU is electrically connected between the first energy storage circuit and the touch detection drive circuit, and the second PMU is configured to convert the primary power supply voltage into a working voltage of the touch detection drive circuit. The battery and the first PMU may form the foregoing power supply for providing the primary power supply voltage.

Optionally, the electronic device further includes a first circuit board and a second circuit board. The second reference ground is disposed in the first circuit board, and the touch detection drive circuit is disposed on the first circuit board. The first reference ground is disposed in the second circuit board, and the isolation power supply circuit and the alternating current amplification circuit are disposed on the second circuit board. In this way, by disposing the first circuit board and the second circuit board, the touch detection drive circuit, the isolation power supply circuit, and the alternating current amplification circuit can be connected to reference grounds in different circuit boards.

Optionally, the electronic device further includes a first circuit board and a second circuit board. The second reference ground is disposed in the first circuit board, and the touch detection drive circuit and the isolation power supply circuit are disposed on the first circuit board. The first reference ground is disposed in the second circuit board, and the alternating current amplification circuit is disposed on the second circuit board. In this way, by disposing the first circuit board and the second circuit board, the touch detection drive circuit, the isolation power supply circuit, and the alternating current amplification circuit can be connected to reference grounds in different circuit boards.

Optionally, the touch electrode is a self-capacitance electrode. The electronic device further includes a cover, and the cover and the first circuit board are stacked. The first circuit board includes first copper foil close to the cover. The first copper foil includes a plurality of self-capacitance electrodes. The self-capacitance electrodes are connected to the cover. The touch detection drive circuit is disposed on a side surface that is of the first circuit board and that is away from the cover. In this way, the first copper foil that is in the first circuit board and that is closest to the cover is multiplexed into the self-capacitance electrode, and there is no need to add a conducting layer for manufacturing the self-capacitance electrode, thereby simplifying a product structure. In this case, the electronic device may be a touchpad without a display function, and the touchpad employs a self-capacitance touch manner.

Optionally, the touch electrode is a self-capacitance electrode. The electronic device further includes a cover and a first display, and the self-capacitance electrode is located between the cover and an out-light surface of the first display. A material of the self-capacitance electrode includes a transparent conductive material. In this case, the electronic device may have a display function, and the electronic device employs a self-capacitance touch manner.

Optionally, the touch detection drive circuit includes a drive detection end, and each touch electrode is electrically connected to the drive detection end. The drive detection end is configured to send the touch excitation signal to the touch electrode and receive the detection signal of the touch electrode. In this way, self-capacitance touch can be implemented by using the plurality of block-shaped touch electrodes that are disposed at intervals.

Optionally, there are a plurality of touch electrodes. The plurality of touch electrodes include a plurality of transmit electrodes and a plurality of receive electrodes. The plurality of transmit electrodes and the plurality of receive electrodes are crossed and insulated. The electronic device further includes a cover. The cover and the first circuit board are stacked. The first circuit board includes first copper foil and second copper foil that are stacked and insulated. The first copper foil includes a plurality of transmit electrodes. The second copper foil includes a plurality of receive electrodes. The transmit electrodes or the receive electrodes are connected to the cover. The touch detection drive circuit is disposed on a side surface that is of the first circuit board and that is away from the cover. In this way, the first copper foil in the first circuit board is multiplexed into the transmit electrode, and the second copper foil is multiplexed into the receive electrode, and there is no need to add a conducting layer for manufacturing the conducting layer of the touch electrode, thereby simplifying a product structure. In this case, the electronic device may be a touchpad without a display function, and the touchpad employs a mutual-capacitance touch manner.

Optionally, there are a plurality of touch electrodes. The plurality of touch electrodes include a plurality of transmit electrodes and a plurality of receive electrodes. The plurality of transmit electrodes and the plurality of receive electrodes are crossed and insulated. The electronic device further includes a cover and a first display, and the transmit electrodes and the receive electrodes are located between the cover and an out-light surface of the first display. In this case, the electronic device may have a display function, and the electronic device employs a mutual-capacitance touch manner.

Optionally, the touch detection drive circuit includes a drive end and a detection end. Each transmit electrode is electrically connected to the drive end, and the drive end is configured to send the touch excitation signal to the transmit electrode. Each receive electrode is electrically connected to the detection end, and the detection end is configured to receive a detection signal of the receive electrode. In this way, mutual-capacitance touch can be implemented by using the plurality of transmit electrodes and the plurality of receive electrodes.

Optionally, the second circuit board and the first circuit board are stacked and are located on a side that is of the first circuit board and that is away from the cover. In this way, by disposing the first circuit board and the second circuit board, the touch detection drive circuit and other control circuits (for example, the processor, the isolation power supply circuit, and the alternating current amplification circuit) in the electronic device may be disposed on different circuit boards. In this case, in a process of attaching the first circuit board to the cover by using a large quantity of double-sided tapes, faults of the foregoing other control circuits in the attaching process can be reduced, and it is beneficial to test the touch detection drive circuit on the first circuit board. In addition, because there are usually a relatively large quantity of touch electrodes in the electronic device, there are also a relatively large quantity of signal cables used to electrically connect the touch electrodes to the touch detection drive circuit. Therefore, the touch detection drive circuit and the touch electrodes need to be disposed on a same circuit board, thereby facilitating connection of the foregoing signal cables.

According to another aspect of this application, a touch system is provided. The touch system may include a second display and any electronic device described above. The second display is communicatively connected to the electronic device. The touch system has a same technical effect as the electronic device provided in the foregoing embodiment, and details are not described herein again.

According to another aspect of this application, a control method for an electronic device is provided. The electronic device includes a plurality of touch electrodes, a touch detection drive circuit, an isolation power supply circuit, an alternating current amplification circuit, a first reference ground, and a second reference ground. The touch detection drive circuit is electrically connected to the touch electrode, and the isolation power supply circuit is electrically connected to the touch detection drive circuit, the first reference ground, and the second reference ground. The alternating current amplification circuit is electrically connected to the touch detection drive circuit, the first reference ground, and the second reference ground. The control method includes: inputting, by the touch detection drive circuit in a sampling period, a touch excitation signal to the touch electrode and receiving a detection signal of the touch electrode, where the touch excitation signal includes a touch detection phase and a non-touch detection phase in the sampling period; receiving and amplifying, by the alternating current amplification circuit, the touch excitation signal to generate a voltage regulation signal, and transmitting the voltage regulation signal to the second reference ground, where a peak-to-peak value of the voltage regulation signal is greater than a voltage value of the first reference ground; and receiving, by the isolation power supply circuit, the touch excitation signal and a primary power supply voltage; based on the touch excitation signal in the non-touch detection phase, short-circuiting the first reference ground and the second reference ground, storing the primary power supply voltage, and transmitting the primary power supply voltage to the touch detection drive circuit; and in the touch detection phase, disconnecting the first reference ground and the second reference ground and discharging to the touch detection drive circuit. The control method has a same technical effect as the electronic device provided in the foregoing embodiment, and details are not described herein again.

According to another aspect of this application, a hovering touch control module is provided. The hovering touch control module is configured to: if there is a specific distance between a finger and a touch electrode, detect a variation of a capacitor formed between the finger and the touch electrode. The hovering touch control module may include a chip system. The chip system may be a structure packaged by a single bare chip. Alternatively, the chip system may be a structure packaged by a plurality of bare chips. The chip system may include a first reference ground, a second reference ground, a touch detection drive module, an isolation power supply module, and an alternating current amplification module. The touch detection drive module is electrically connected to the touch electrode and the second reference ground. The touch detection drive module is configured to: in a sampling period, input a touch excitation signal to the touch electrode and receive a detection signal of the touch electrode. The touch excitation signal includes a touch detection phase and a non-touch detection phase in the sampling period. The isolation power supply module is electrically connected to the touch detection drive module, the first reference ground, and the second reference ground. The isolation power supply module is configured to receive the touch excitation signal and a primary power supply voltage; based on the touch excitation signal in the non-touch detection phase, short-circuit the first reference ground and the second reference ground, store the primary power supply voltage, and transmit the primary power supply voltage to the touch detection drive module; and in the touch detection phase, disconnect the first reference ground from the second reference ground and discharge to the touch detection drive module. The alternating current amplification module is electrically connected to the second reference ground and the first reference ground. The alternating current amplification module is configured to: receive and amplify the touch excitation signal to generate a voltage regulation signal, and transmit the voltage regulation signal to the second reference ground. A peak-to-peak value of the voltage regulation signal is greater than a voltage value of the first reference ground. The chip system has a same technical effect as the electronic device provided in the foregoing embodiment, and details are not described herein again.

Optionally, the isolation power supply module includes a signal conversion module, a first energy storage module, a first switch module, and a second switch module. The signal conversion module is configured to: receive the touch excitation signal, and filter out a high frequency signal in the touch phase in the touch excitation signal to generate a sampling signal. The first energy storage module is electrically connected to the touch detection drive module. The first energy storage module is configured to: store the primary power supply voltage in the non-touch phase, and discharge to the touch detection drive module in the touch detection phase. A control end of the first switch module is electrically connected to the signal conversion module, a first end of the first switch module is electrically connected to the first reference ground, and a second end of the first switch module is electrically connected to the second reference ground. The first switch module is configured to: under control of the sampling signal, short-circuit the first reference ground and the second reference ground in a conducting state in the non-touch detection phase, and disconnect the first reference ground from the second reference ground in a cut-off state in the touch detection phase. A control end of the second switch module is electrically connected to the signal conversion module, a first end of the second switch module is configured to receive the primary power supply voltage, and a second end of the second switch module is electrically connected to the first energy storage module. The second switch module is configured to: under control of the sampling signal, transmit the received primary power supply voltage to the first energy storage module and the touch detection drive module in a conducting state in the non-touch detection phase, and enable the first energy storage module to discharge in a cut-off state in the touch detection phase. The isolation power supply module has the same technical effect as the isolation power supply circuit provided in the foregoing embodiment, and details are not described herein again

BRIEF DESCRIPTION OF THE DRAWINGS

FIG. 16A-1 and FIG. 16A-2 are a schematic diagram of a structure of a touch system according to an embodiment of this application;

REFERENCE SIGNS

Figure 1:
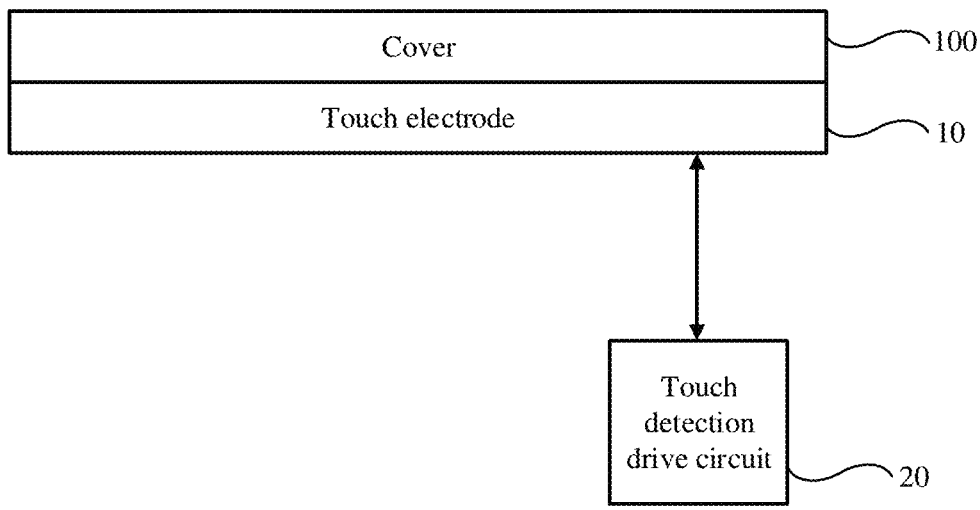
FIG. 1 is a schematic diagram of a structure of an electronic device according to an embodiment of this application.

01: Electronic device; 10: Touch electrode; 20: Touch detection drive circuit; 100: Cover; 02: First display; 11: Self-capacitance electrode; 12: Touch lead; 201: Drive detection end; 210: Excitation generation unit; 221: Capacitance detection unit; 202: Drive end; 203: Detection end; TX: Transmit electrode; RX: Receive electrode; 110: Block electrode; 112: Strip electrode; 30: Isolation power supply circuit; 40: Alternating current amplification circuit; 51: First isolation element; 60: Battery; 61: First PMU; 401: Operational amplifier; 70: Processor; 501: Light emitting device; 502: Optical-to-electrical converter; 503: Signal input interface; 504: Isolation capacitor; 505: Signal output interface; 506: Acoustic device; 507: Acoustic-to-electric converter; 52: Second isolation element; 101: First circuit board; 102: Second circuit board; 111: First copper foil; 222: Second copper foil; 81: First transmission element; 82: Second transmission element; 83: Display end processor; 04: Second display; 90: Cursor; 301: Signal conversion circuit; 302: First energy storage circuit; 303: First switch circuit; 304: Second switch circuit; 311: Diode; 321: Second energy storage circuit; 331: Third switch circuit; 341: Phase inverter; 351: Logic control circuit; 62: Second PMU.

DETAILED DESCRIPTION OF ILLUSTRATIVE EMBODIMENTS

The following describes the technical solutions in embodiments of this application with reference to the accompanying drawings in embodiments of this application. It is clear that the described embodiments are merely a part rather than all of embodiments of this application.

The terms "first" and "second" mentioned below are merely intended for a purpose of description, and shall not be understood as an indication or implication of relative importance or implicit indication of the number of indicated technical features. Therefore, a feature limited by "first" or "second" may explicitly indicate or implicitly include one or more such features.

In addition, in this application, orientation terms such as "left", "right", "up", and "down" are defined relative to orientations of schematic placement of components in the accompanying drawings. It should be understood that these directional terms are relative concepts for relative description and clarification, and may change accordingly based on a change in placement orientations of components in the accompanying drawings.

In this application, unless otherwise specified and limited, the term "electrical connection" should be understood in a broad sense. For example, the "electrical connection" may be a direct electrical connection, or may be an indirect electrical connection through an intermediate medium.

An embodiment of this application provides an electronic device. The electronic device may include electronic products with a touch function, such as a touchpad, a mobile phone (mobile phone), a tablet computer (pad), a television, and an intelligent wearable product (for example, a smartwatch or a smart band). A specific form of the foregoing electronic device is not specially limited in this embodiment of this application.

When the foregoing electronic device 01 has a touch function, as shown in FIG. 1, the electronic device 01 may include a touch electrode 10, a cover 100 covering the touch electrode 10, and a touch detection drive circuit 20 electrically connected to the touch electrode 10. The touch detection drive circuit 20 is configured to input a touch excitation signal to the touch electrode 10 and receive a detection signal of the touch electrode 10, to implement touch detection.

It should be noted that the cover 100 may be a substrate made of glass, polyethylene terephthalate (polyethylene terephthalate, PET), or polycarbonate (polycarbonate, PC). The cover 100 may be transparent (for example, a light transmittance may be above 85%), or may be totally opaque.

Figure 2A:
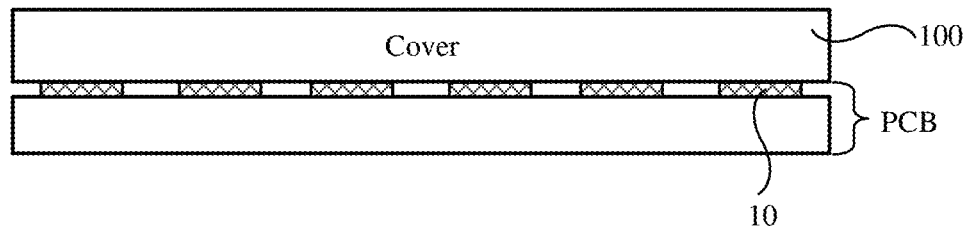
FIG. 2A is a schematic diagram of a disposing manner of a touch electrode according to an embodiment of this application.

In some embodiments of this application, the electronic device 01 may be a touchpad without a display function. In this case, the electronic device 01 may be provided with a printed circuit board (printed circuit boards, PCB) shown in FIG. 2A. The PCB and the cover 100 may be stacked, and the cover 100 may be totally opaque. In this case, a metal layer that is in the PCB and that is close to the cover 100 may be manufactured into the touch electrode 10.

Figure 2B:
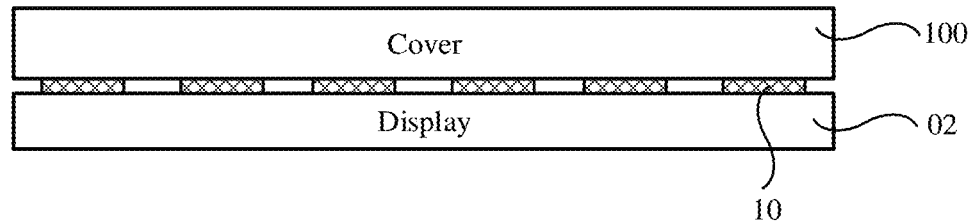
FIG. 2B is a schematic diagram of another disposing manner of a touch electrode according to an embodiment of this application.

Alternatively, in some other embodiments of this application, when the electronic device 01 has a display function, as shown in FIG. 2B, the electronic device 01 may include a first display 02, the foregoing cover 100, and the touch electrode 10 between an out-light surface (a surface for displaying an image) of the first display 02 and the cover 100. The first display 02 may be a first liquid crystal display (liquid crystal display, LCD), or may be a first organic light emitting diode (organic light emitting diode, OLED) display capable of implementing self-luminance. In addition, a material constituting the touch electrode 10 may include a transparent conductive material, for example, indium tin oxide (indium tin oxide, ITO) or indium zinc oxide (indium zinc oxide, IZO).

Figure 3:
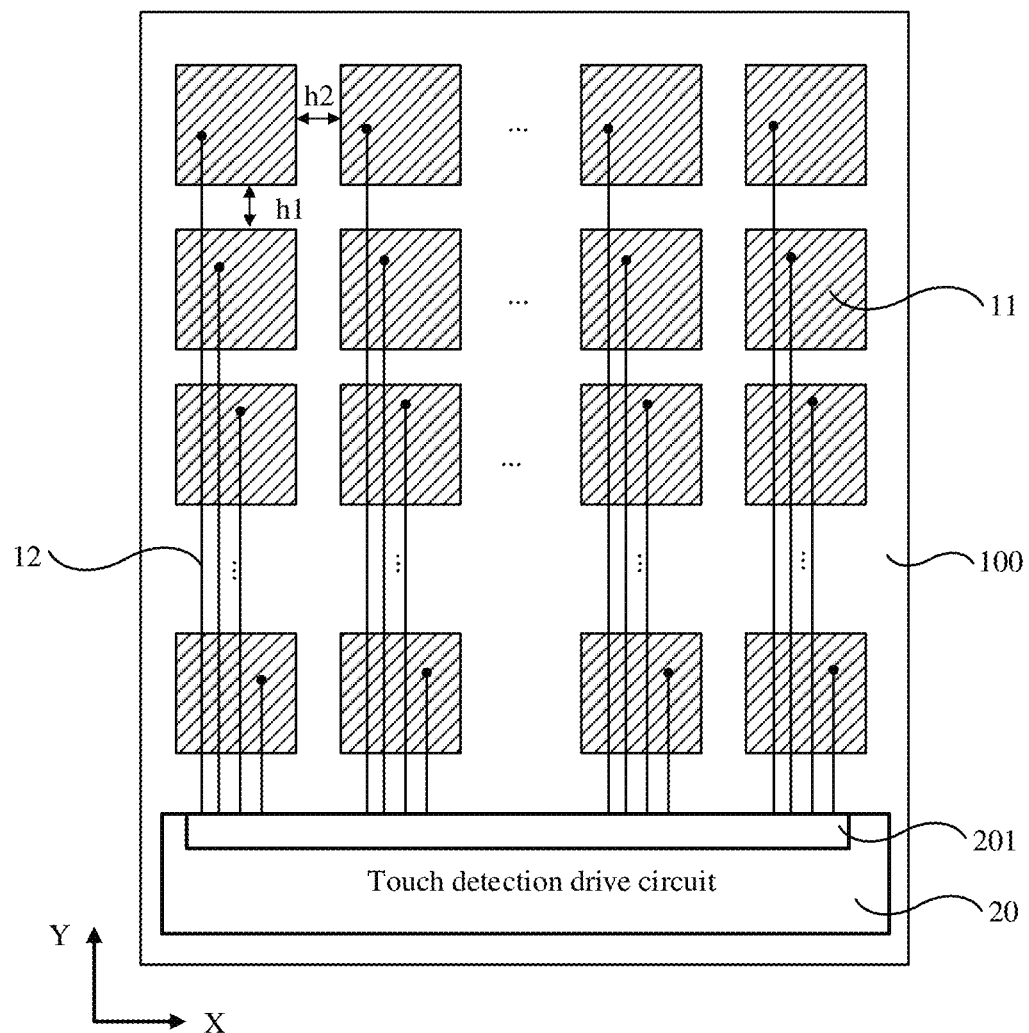
FIG. 3 is a schematic diagram of another disposing manner of a touch electrode according to an embodiment of this application.

The electronic device 01 usually includes a plurality of touch electrodes 10. For example, in some embodiments of this application, the electronic device 01 may employ a self-capacitance touch technology. In this case, the plurality of touch electrodes 10 may be a plurality of block-shaped self-capacitance electrodes 11 shown in FIG. 3. The plurality of self-capacitance electrodes 11 may be disposed at intervals along a first direction Y at a preset spacing distance h1. In addition, the plurality of self-capacitance electrodes 11 may be alternatively disposed at intervals along a second direction X at a preset spacing distance h2. In this way, the plurality of self-capacitance electrodes 11 may be composed of a same conducting layer. Because the plurality of self-capacitance electrodes 11 are not connected to each other, the plurality of self-capacitance electrodes 11 can be insulated. The first direction X and the second direction Y may be crossed. Based on this, as shown in FIG. 3, the touch detection drive circuit 20 may include a drive detection end 201, and each of the self-capacitance electrodes 11 may be electrically connected to the drive detection end 201 of the touch detection drive circuit 20 through a touch lead 12.

Figure 4A:
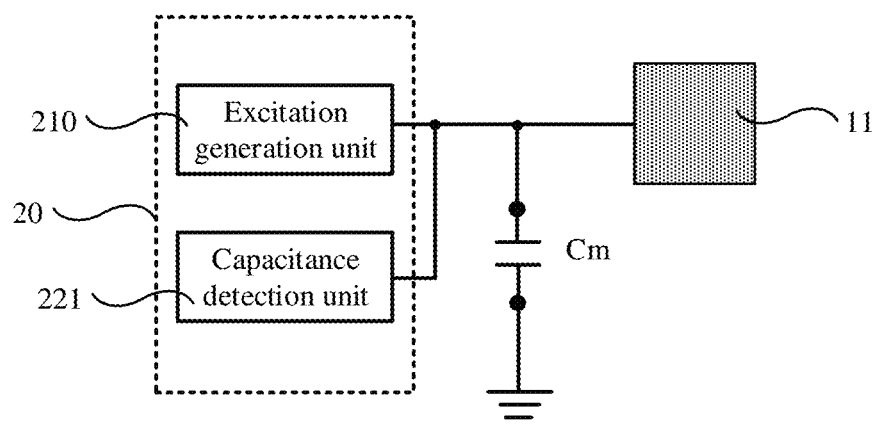
FIG. 4A is a schematic diagram of a touch state in which the touch electrode shown in FIG. 3 is used.
Figure 5:
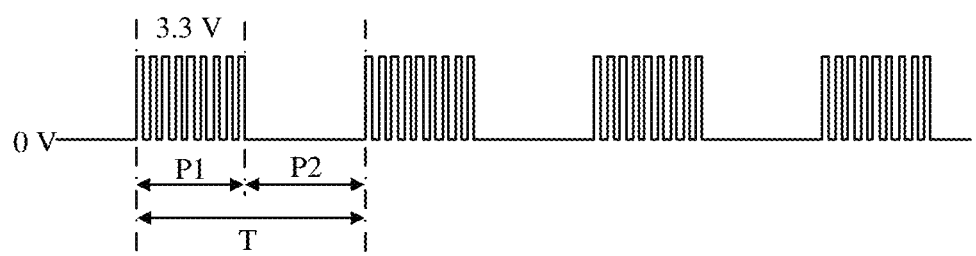
FIG. 5 is a waveform diagram of a touch excitation signal according to an embodiment of this application.

In this case, to implement touch detection, the touch detection drive circuit 20 may include an excitation generation unit 210 and a capacitance detection unit 221 shown in FIG. 4A. The excitation generation unit 210 may send a touch excitation signal S1 to the self-capacitance electrode 11 in a sampling period T by using the drive detection end 201. As shown in FIG. 5, the touch excitation signal S1 may be a square wave signal.

For example, the touch excitation signal S1 may be a square wave signal whose sampling frequency is 120 Hz (that is, sampling is performed 120 times per second) and whose scanning frequency is greater than 100 kHz (for example, 300 kHz) in each sampling period T. In each sampling period T, the touch excitation signal S1 may include a touch phase P1 and a non-touch phase P2. In the touch phase P1 (an area in which square waves are relatively dense in FIG. 5), the touch excitation signal S1 may be used to scan all self-capacitance electrodes 11 in the electronic device 01 at least once at a scanning frequency greater than 100 kHz (for example, 300 kHz). In the non-touch phase P1, the touch excitation signal S1 is always at a low level. In addition, a peak-to-peak value of the excitation signal S1 may be 3.3 V.

In addition, as shown in FIG. 4A, there is a relatively small parasitic capacitor Cm between the self-capacitance electrode 11 and a reference ground (for example, GND). In a process of scanning the self-capacitance electrode 11, the capacitance detection unit 221 in the touch detection drive circuit 20 detects a charge/discharge time of the parasitic capacitor Cm in each touch phase P1 by using the drive detection end 201. When a finger does not approach the self-capacitance electrode 11, in the touch phase P1, the charge/discharge time of the parasitic capacitor Cm is a constant. For example, when the touch detection drive circuit 20 provides the touch excitation signal S1 whose peak-to-peak value is 3.3 V for the self-capacitance electrode 11, a voltage difference between a positive electrode plate and a negative electrode plate of the parasitic capacitor Cm is about 3.3 V.

Figure 4B:
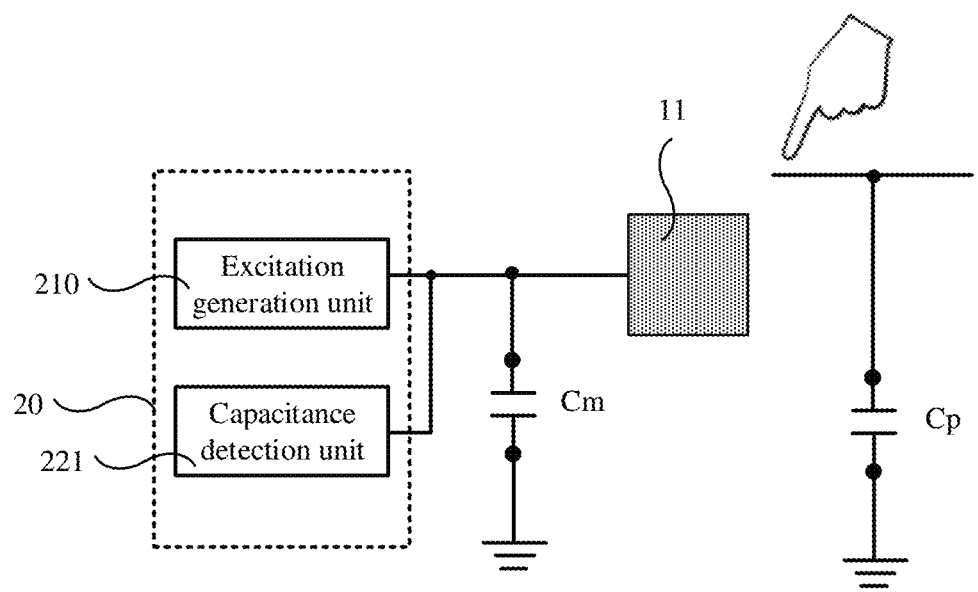
FIG. 4B is a schematic diagram of a touch state in which the touch electrode shown in FIG. 3 is used.

When the finger approaches the self-capacitance electrode 11, as shown in FIG. 4B, the finger may be equivalent to the reference ground (for example, 0 V), and an equivalent capacitor Cp is formed between the finger and the self-capacitance electrode 11. When the touch detection drive circuit 20 provides the touch excitation signal S1 whose peak-to-peak value is 3.3 V for the self-capacitance electrode 11, a voltage difference between a positive electrode plate and a negative electrode plate of the equivalent capacitor Cp is about 3.3 V. In this case, in the touch phase P1, the touch detection drive circuit 20 needs to detect the charge/discharge time of the parasitic capacitor Cm and that of the equivalent capacitor Cp, so that a charge/discharge time that is of a capacitor and that is detected by the touch detection drive circuit 20 is greatly prolonged. The touch detection drive circuit 20 may calculate a magnitude of the equivalent capacitor Cp by using the detected actual charge/discharge time and the charge/discharge time of the parasitic capacitor Cm that is used as a constant, to implement touch detection.

Alternatively, for another example, the electronic device 01 may employ a mutual-capacitance touch technology. In this case, the plurality of touch electrodes 10 may include a plurality of transmit electrodes TX and a plurality of receive electrodes RX shown in FIG. 6A, and the plurality of transmit electrodes TX and the plurality of receive electrodes RX are crossed and insulated. In addition, each of the plurality of transmit electrodes TX may extend along the first direction Y, and the plurality of transmit electrodes TX may be disposed side by side along the second direction X at a preset spacing distance h3. Each of the plurality of receive electrodes RX may extend along the second direction X, and the plurality of receive electrodes RX may be disposed side by side along the first direction Y at a preset spacing distance h4, so that the plurality of transmit electrodes TX and the plurality of receive electrodes RX can be crossed. In addition, the transmit electrode TX and the receive electrode RX may be composed of two different conducting layers, and the two conducting layers are insulated by using an insulation layer. In this case, the touch detection drive circuit 20 may include a drive end 202 and a detection end 203. Each transmit electrode TX may be electrically connected to the drive end 202. Each receive electrode RX is electrically connected to the detection end 203.

Figure 6A:
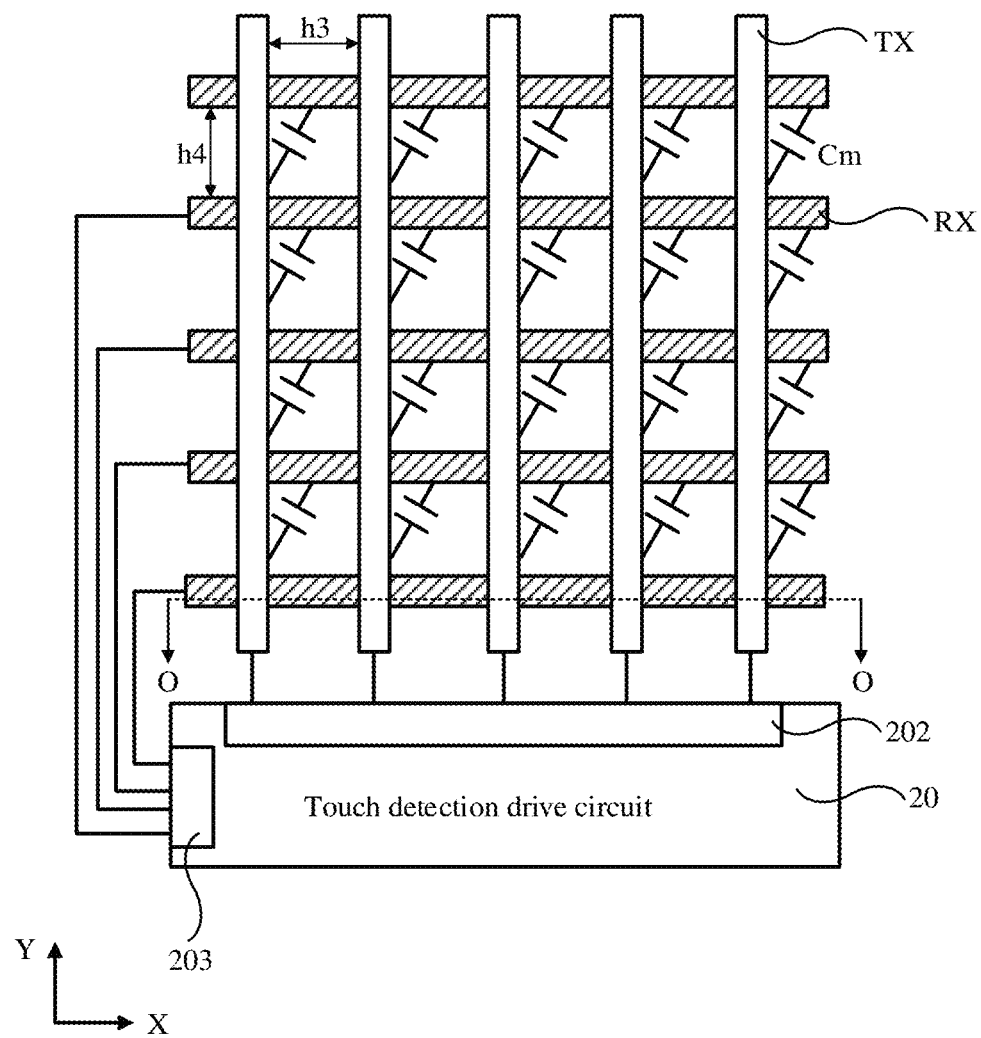
FIG. 6A is a schematic diagram of another disposing manner of a touch electrode according to an embodiment of this application.
Figure 6B:
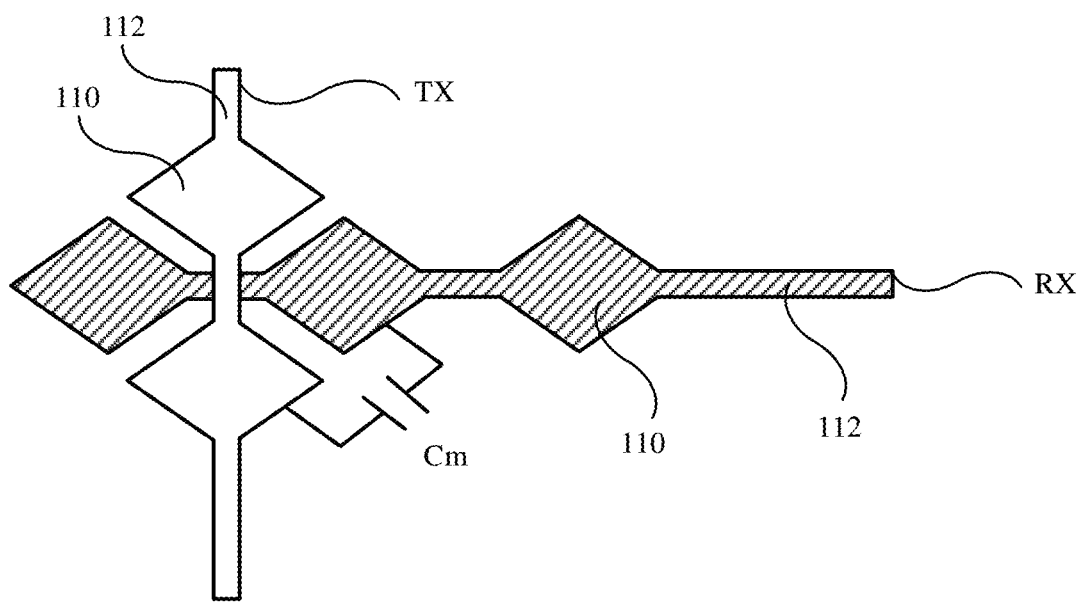
FIG. 6B is a specific schematic diagram of a structure of a transmit electrode and a receive electrode in FIG. 6A.

As shown in FIG. 6B, either of the transmit electrode TX and the receive electrode RX may include a plurality of block electrodes 110 and strip electrodes 112 connected to the plurality of block electrodes 110. At a position at which a strip electrode 112 of the transmit electrode TX and a strip electrode of the receive electrode RX are crossed, a parasitic capacitor Cm may be formed between a block electrode 110 of the transmit electrode TX and a block electrode 110 of the receive electrode RX, and therefore any group of transmit electrodes TX and receive electrodes RX that cross horizontally and vertically shown in FIG. 6A has the parasitic capacitor Cm at a cross position.

In this case, to implement touch detection, the touch detection drive circuit 20 may send the touch excitation signal S1 (as shown in FIG. 5) to the transmit electrode TX by using the drive end 202 shown in FIG. 6A, to charge the parasitic capacitor Cm. In addition, in a process of scanning the transmit electrode TX, the touch detection drive circuit 20 further detects a detection signal of the receive electrode RX by using the detection end 203, to determine a discharge time of the parasitic capacitor Cm in each touch phase P1, and obtain a capacitance value of Cm.

Figure 6C:
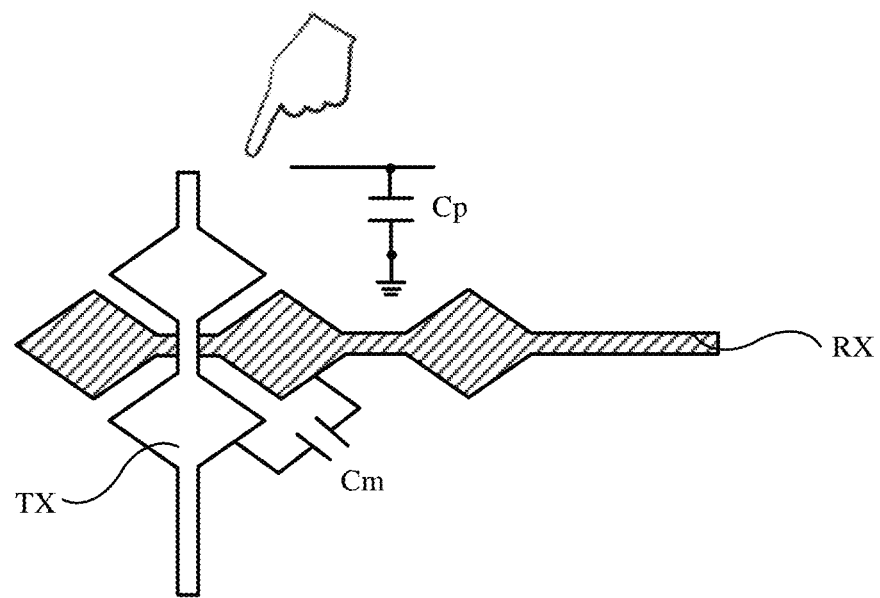
FIG. 6C is a schematic diagram of a touch state in which the touch electrode shown in FIG. 6B is used.

Similarly, when the finger does not approach the transmit electrode TX or the receive electrode RX, the parasitic capacitor Cm is a constant. When the finger approaches the transmit electrode TX and the receive electrode RX, it can be learned from the foregoing that the finger may be equivalent to the reference ground (for example, 0 V), and an equivalent capacitor Cp is formed between the finger and the transmit electrode TX. Therefore, as shown in FIG. 6C, it is equivalent to that an equivalent capacitor Cp is connected in parallel at two ends of the parasitic capacitor Cm. In this way, when the touch detection drive circuit 20 detects that the capacitance value increases, it may be determined that the finger performs touch, thereby implementing touch detection.

It can be learned from the foregoing that, for either a self-capacitance touch manner or a mutual-capacitance touch manner, when a finger of a user approaches the touch electrode, the equivalent capacitor Cp is generated, and the touch detection drive circuit 20 detects a charge/discharge time of the capacitor in the touch phase P1, so that the magnitude of the equivalent capacitor Cp can be obtained, to implement touch detection. In a process of measuring the equivalent capacitor Cp, detection by the touch detection drive circuit 20 on a charge/discharge process of the parasitic capacitor Cm is considered as noise, affecting measurement precision of the equivalent capacitor Cp. In addition, the closer the finger is to the touch electrode, the larger the capacitance value of the equivalent capacitor Cp is. When the finger is farther away from the touch electrode, the smaller the capacitance value of the equivalent capacitor Cp is. Therefore, when the finger is away from the touch electrode to perform hovering touch, precision of touch detection is further reduced.

Figure 7:
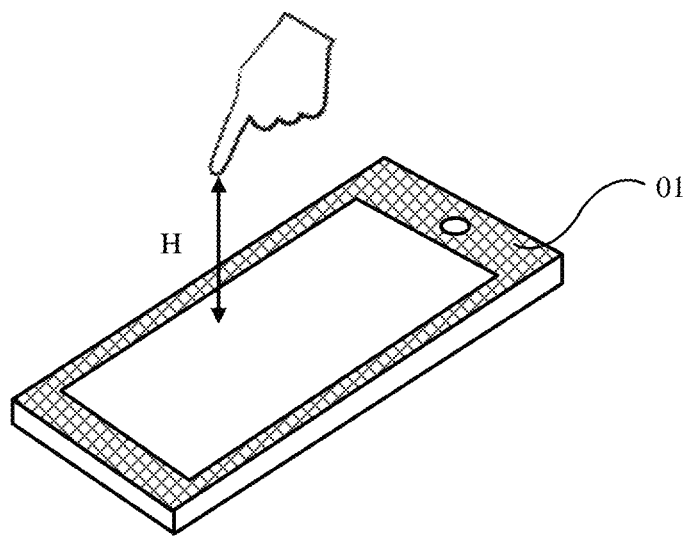
FIG. 7 is a schematic diagram of hovering touch according to an embodiment of this application.

In this case, in this embodiment of this application, resolution and a signal-to-noise ratio of signal detection of the equivalent capacitor Cp may be increased, so that when a distance H between the finger shown in FIG. 7 and the touch electrode of the electronic device 01 is relatively long (for example, H≥20 mm), the charge/discharge time of the equivalent capacitor Cp can also be accurately detected, thereby implementing hovering touch.

The following uses an example in which the touch electrode 10 is the foregoing self-capacitance electrode. To increase a full range and a signal-to-noise ratio of signal detection of the equivalent capacitor Cp, the electronic device provided in this embodiment of this application may include a first reference ground GND 1 (for example, 0 V) and a second reference ground GND 2 (for example, a peak-to-peak voltage value may be about 20 V) shown in FIG. 8. The foregoing parasitic capacitor Cm is formed between the touch electrode 10 and the second reference ground GND 2. In this case, the touch electrode 10 and the second reference ground GND 2 (20 V) may be respectively used as a positive electrode plate and a negative electrode plate of the parasitic capacitor Cm. When the touch detection drive circuit 20 provides the touch excitation signal S1 whose peak-to-peak value is 3.3 V for the touch electrode 10, a voltage of the touch electrode 10 is 23.3 V, and a voltage difference between the positive electrode plate and the negative electrode plate of the parasitic capacitor Cm is about 3.3 V.

Figure 8:
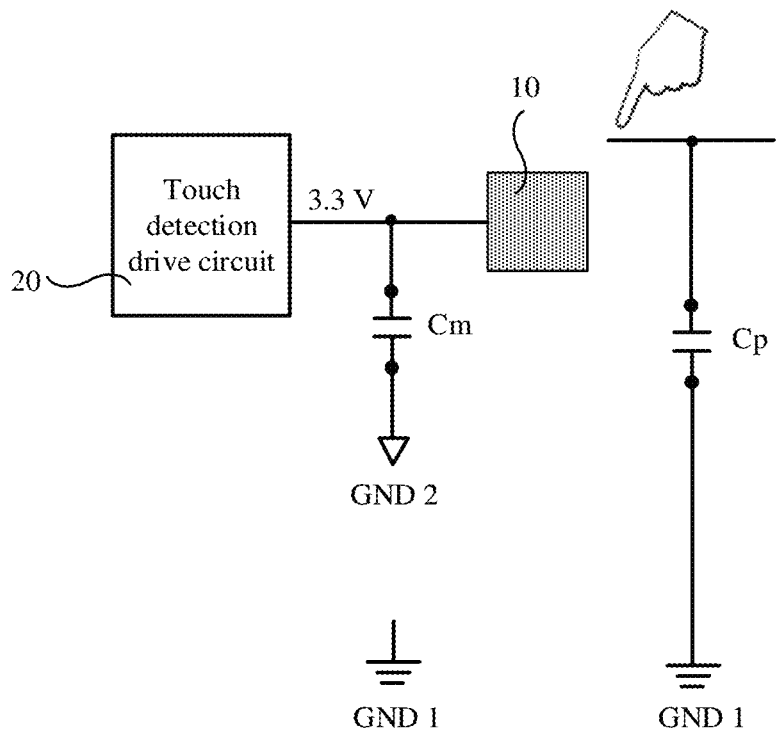
FIG. 8 is a schematic diagram of another touch state according to an embodiment of this application.

In addition, as shown in FIG. 8, when the finger approaches the touch electrode 10, the finger may be equivalent to the first reference ground GND 1 (for example, 0 V), and an equivalent capacitor Cp is formed between the finger and the touch electrode 10. In this case, the touch electrode 10 and the finger equivalent to the first reference ground GND 1 may be respectively used as a positive electrode plate and a negative electrode plate of the equivalent capacitor Cp. It can be learned from the foregoing that the voltage of the touch electrode 10 is 23.3 V, and a voltage difference between the positive electrode plate and the negative electrode plate of the equivalent capacitor Cp may be about 23.3 V.

In this way, in a same charge/discharge time, in comparison with the solution shown in FIG. 4B, the voltage difference between the positive electrode plate and the negative electrode plate of the equivalent capacitor Cp may be increased from 3.3 V to 23.3 V, and therefore an electrical signal used to detect the charge/discharge time of the equivalent capacitor Cp is amplified, thereby increasing resolution of signal detection of the equivalent capacitor Cp. In addition, in a process in which the touch detection drive circuit 20 detects the charge/discharge of the equivalent capacitor Cp and that of the parasitic capacitor Cm, the voltage difference between the positive electrode plate and the negative electrode plate of the equivalent capacitor Cp is relatively large (for example, about 23.3 V), and the voltage difference between the positive electrode plate and the negative electrode plate of the parasitic capacitor Cm is relatively small (for example, about 3.3 V). Therefore, although detection by the touch detection drive circuit 20 on the charge/discharge process of the parasitic capacitor Cm is considered as noise, a ratio of the noise to a detection signal obtained by detecting the charge/discharge process of the equivalent capacitor Cp is relatively small, thereby increasing a signal-to-noise ratio of touch detection. This helps accurately detect a touch position when the finger of the user performs touch in a hovering state (as shown in FIG. 7, H≥20 mm). In this case, when the electronic device 01 provided in this embodiment of this application is used to perform hovering touch, a detection range applicable to hovering touch can be increased from 5 mm to more than 20 mm while precision of touch detection is ensured. This helps improve comfort of hovering touch of the user.

In addition, in this application, a voltage of the second reference ground GND 2 is raised, to increase the detection range applicable to hovering touch and improve the precision of touch detection. Compared with a solution in which a voltage of the touch excitation signal S1 is increased, a semiconductor in the electronic device 01 does not need to use a high-voltage and high-speed withstand process, thereby reducing production costs. In addition, a phenomenon that the touch electrode 10 breaks down because the voltage of the touch excitation signal S1 is excessively high (for example, 10 V) can be avoided. In addition, for a solution in which an ultrasonic wave, a time of flight (time of flight, TOF), invisible light, or the like is used as a transmit signal to implement touch, the finger needs to receive the transmit signal in a specific area. However, in this application, hovering touch is implemented in a capacitive touch manner, and a coverage area of the touch electrode 10 may be adjusted as required. Therefore, this helps increase an activity range of the user during hovering touch.

It should be noted that the foregoing description is provided by using an example in which the touch electrode 10 is a self-capacitance electrode. When the touch electrode includes the transmit electrode TX and the receive electrode RX shown in FIG. 6C, similarly, the receive electrode RX may be disconnected from the first reference ground GND 1 (for example, 0 V), and is electrically connected to the second reference ground GND 2 (for example, a peak-to-peak voltage value may be about 20 V), so that the voltage difference between the positive electrode plate and the negative electrode plate of the parasitic capacitor Cm formed between the transmit electrode TX and the receive electrode RX is about 3.3 V. The voltage difference between the positive electrode plate and the negative electrode plate of the equivalent capacitor Cp formed between the finger equivalent to the first reference ground GND 1 (for example, 0 V) and the transmit electrode TX is about 23.3 V, thereby increasing resolution and a signal-to-noise ratio of touch detection.

In view of the above, to increase the resolution and the signal-to-noise ratio of touch detection, a voltage of the negative electrode plate of the parasitic capacitor Cm needs to be raised from the original first reference ground GND 1 (for example, 0 V) to the second reference ground GND 2 (for example, the peak-to-peak voltage value may be about 20 V). In this case, for example, the touch electrode 10 is a self-capacitance electrode. To provide the touch excitation signal S1 for the touch electrode 10 used as the positive electrode plate of the parasitic capacitor Cm, the touch detection drive circuit 20 needs to be disconnected (that is, isolated) from the first reference ground GND 1 (for example, 0 V) and electrically connected to the second reference ground GND 2 (for example, the peak-to-peak voltage value may be about 20 V), so that the touch excitation signal S1 can be normally output. The following uses an example in which the touch electrode 10 is a self-capacitance electrode to describe in detail a setting manner of the second reference ground GND 2 and a power supply manner of the touch detection drive circuit 20.

Figure 9A:
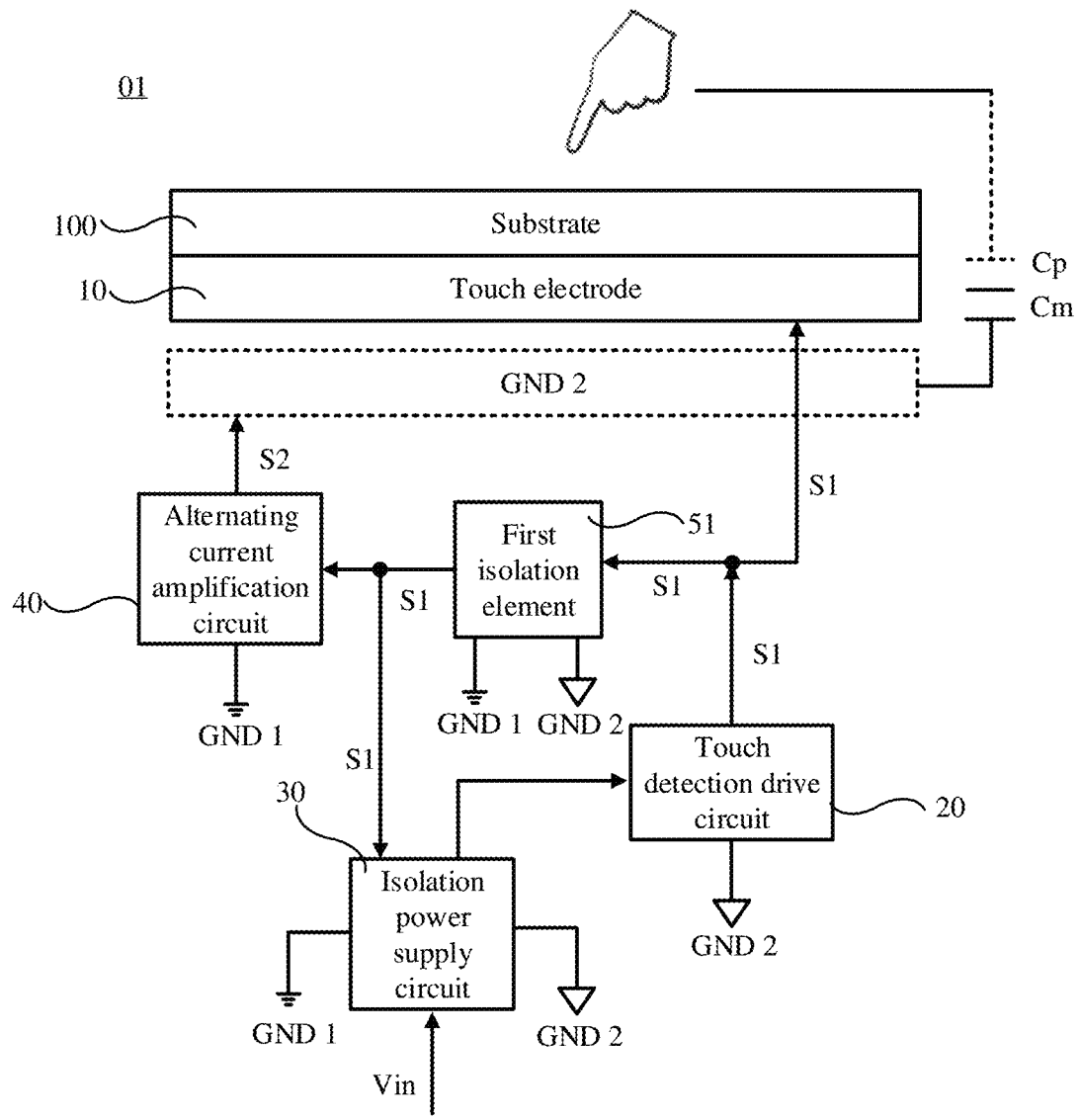
FIG. 9A is a schematic diagram of a structure of another electronic device according to an embodiment of this application.

The electronic device of further includes an isolation power supply circuit 30 and an alternating current amplification circuit 40 shown in FIG. 9A. The isolation power supply circuit 30 is electrically connected to the touch detection drive circuit 20, the first reference ground GND 1, and the second reference ground GND 2. The isolation power supply circuit 30 may be configured to: receive the touch excitation signal S1; and based on the touch excitation signal S1 in the non-touch detection phase P2 (as shown in FIG. 5), short-circuit the first reference ground GND 1 and the second reference ground GND 2, and store a primary power supply voltage Vin. In addition, the isolation power supply circuit 30 is further configured to transmit the primary power supply voltage Vin to the touch detection drive circuit 20, to supply power to the touch detection drive circuit 20.

In this case, the touch drive detection circuit 20 may be grounded by using the second reference ground GND 2. Because the first reference ground GND 1 and the second reference ground GND 2 are short-circuited, the voltage of the second reference ground GND 2 is the same as that of the first reference ground GND 1 in this case, for example, 0 V. Therefore, when the isolation power supply circuit 30 transmits the primary power supply voltage Vin to the touch detection drive circuit 20, the touch drive detection circuit 20 can be in a working state, and output the touch excitation signal S1.

In addition, in the touch detection phase P1 (as shown in FIG. 5), the isolation power supply circuit 30 may disconnect the first reference ground GND 1 from the second reference ground GND 2, to isolate the first reference ground GND 1 from the second reference ground GND 2. In addition, the isolation power supply circuit 30 may release electric energy stored in the non-touch detection phase P2 to the touch detection drive circuit 20, to supply power to the touch detection drive circuit 20. In this case, the touch drive detection circuit 20 may be grounded by using the second reference ground GND 2, and the peak-to-peak voltage value of the second reference ground GND 2 may be about 20 V. Therefore, when the isolation power supply circuit 30 discharges to the touch detection drive circuit 20, the touch drive detection circuit 20 can remain in a working state, and output the touch excitation signal S1.

In view of the above, in the non-touch detection phase P2 (as shown in FIG. 5), the isolation power supply circuit 30 may short-circuit the first reference ground GND 1 and the second reference ground GND 2, so that a power supply for providing the primary power supply voltage Vin is electrically connected to the touch drive detection circuit 20, to drive the touch drive detection circuit 20 to output the touch excitation signal S1. In the touch detection phase P1 (as shown in FIG. 5), the isolation power supply circuit 30 may disconnect the first reference ground GND 1 from the second reference ground GND 2, so that the power supply for providing the primary power supply voltage Vin is isolated from the touch drive detection circuit 20, and discharge a power stored in the power supply to the touch drive detection circuit 20, to drive the touch drive detection circuit 20 to output the touch excitation signal S1. In this way, after power-on, the isolation power supply circuit 30 can enable the touch drive detection circuit 20 to be always in a working state.

In addition, after the first reference ground GND 1 is disconnected from the second reference ground GND 2, to enable the peak-to-peak voltage value of the second reference ground GND 2 to be about 20 V, the alternating current amplification circuit 40 may be electrically connected to the first reference ground GND 1 and the second reference ground GND 2. The alternating current amplification circuit 40 is grounded by using the first reference ground GND 1, and in a working process, may be configured to: receive and amplify the touch excitation signal S1 to generate a voltage regulation signal S2 shown in FIG. 9B and transmit the voltage regulation signal S2 to the second reference ground GND 2 shown in FIG. 9A. A peak-to-peak value (for example, about 20 V) of the voltage regulation signal S2 may be greater than a voltage value (for example, 0 V) of the first reference ground.

Figure 9B:
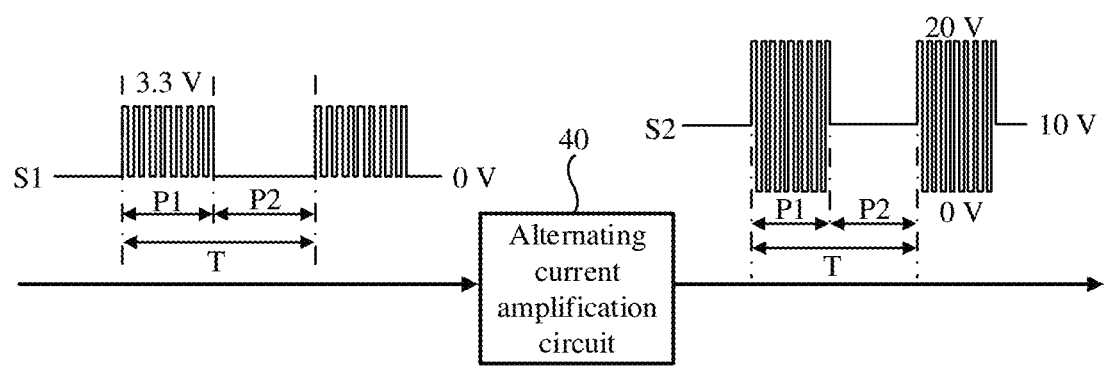
FIG. 9B is a waveform diagram of a voltage regulation signal according to an embodiment of this application.

In a process of amplifying the touch excitation signal S1, the alternating current amplification circuit 40 does not change a period of the touch excitation signal S1. Therefore, as shown in FIG. 9B, a low frequency part of the generated voltage regulation signal S2 still has the foregoing sampling period T (including the touch phase P1 and the non-touch phase P2). In addition, when the alternating current amplification circuit 40 has a voltage bias function, a center bias voltage (for example, 10 V) of the voltage regulation signal S2 may be set based on a preset amplification coefficient, and then a trough voltage (for example, 0 V) and a peak voltage (for example, 20 V) of the voltage regulation signal S2 are set, so that the peak-to-peak value (for example, about 20 V) of the voltage regulation signal S2 meets a requirement of the preset amplification coefficient.

In this way, after the first reference ground GND 1 is disconnected from the second reference ground GND 2, the alternating current amplification circuit 40 may enable a maximum voltage on the second reference ground GND 2 to be about 20 V. The touch detection drive circuit 20 is isolated from the power supply for providing the primary power supply voltage Vin, and is grounded by using the second reference ground GND 2. When the isolation power supply circuit 30 supplies power to the touch detection drive circuit 20, the touch detection drive circuit 20 may remain in a working state, to output the touch excitation signal S1.

For example, the touch detection drive circuit 20 provides the touch excitation signal S1 for the touch electrode 10. As shown in FIG. 5, a peak-to-peak value of the touch excitation signal S1 may be 3.3 V. The alternating current amplification circuit 40 amplifies the touch excitation signal S1 to generate the voltage regulation signal S2. As shown in FIG. 9B, a peak-to-peak value of the voltage regulation signal S2 may be 20 V. In this case, a voltage difference between the touch electrode 10 and the second reference ground GND 2 remains unchanged (that is, a capacitance value of the parasitic capacitor Cm remains unchanged). Therefore, a maximum value of a voltage on the touch electrode 10 is 23.3 V.

In this case, in the touch phase P1, when the finger performs hovering touch, the foregoing equivalent capacitor Cp is formed between the finger equivalent to the first reference ground GND 1 (for example, 0 V) and the touch electrode 10. A voltage difference between two electrode plates (the finger and the touch electrode 10) of the equivalent capacitor Cp may be 23.3 V. Therefore, the electrical signal used to detect the charge/discharge time of the equivalent capacitor Cp is amplified, thereby increasing resolution of signal detection of the equivalent capacitor Cp. In addition, a voltage difference between two electrode plates (the touch electrode 10 and the second reference ground GND 2) of the parasitic capacitor Cm is 3.3 V. Therefore, a ratio of noise generated by the parasitic capacitor Cm to the detection signal obtained by detecting the charge/discharge process of the equivalent capacitor Cp is relatively small, so that a signal-to-noise ratio of touch detection can be increased, thereby facilitating implementation of hovering touch.

It should be noted that the foregoing description is provided by using an example in which the peak-to-peak value of the touch excitation signal S1 output by the touch detection drive circuit 20 is 3.3 V and the peak-to-peak value of the voltage regulation signal S2 output by the alternating current amplification circuit 40 to the second reference ground GND 2 is 23.3 V. The peak-to-peak value of the touch excitation signal S1 and an amplification multiple n of the alternating current amplification circuit 40 are not limited in this application. For example, the peak-to-peak value of the touch excitation signal S1 may be less than or equal to 5 V, and the amplification multiple n of the alternating current amplification circuit 40 may be greater than or equal to 2, so that the peak-to-peak value of the voltage regulation signal S2 output by the alternating current amplification circuit 40 is greater than or equal to 10 V.

Figure 10:
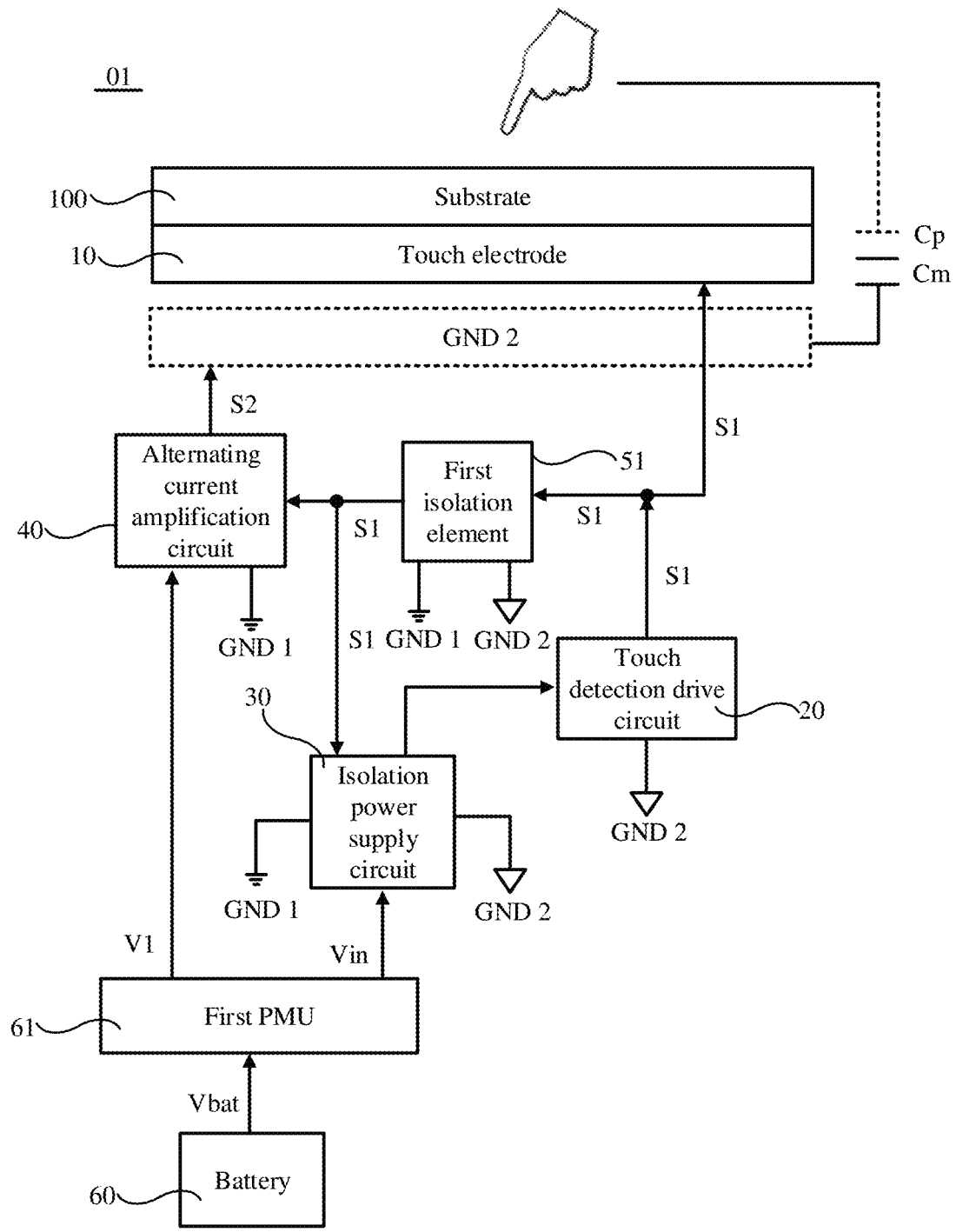
FIG. 10 is a schematic diagram of a structure of another electronic device according to an embodiment of this application.

In addition, to provide the primary power supply voltage Vin to the isolation power supply circuit 30 and supply power to the alternating current amplification circuit 40, in some embodiments of this application, as shown in FIG. 10, the electronic device 01 may further include a power supply configured to provide the primary power supply voltage Vin, the power supply may include a battery 60 and a first power management unit (power management unit, PMU) 61. The first PMU 61 is electrically connected to the battery 60, the isolation power supply circuit 30, and the alternating current amplification circuit 40. The first PMU 61 may convert a battery voltage Vbat of the battery 60 into the primary power supply voltage Vin and transmit the primary power supply voltage Vin to the isolation power supply circuit 30. In addition, the first PMU 61 may further convert the battery voltage Vbat of the battery 60 into a working voltage V1 of the alternating current amplification circuit 40, to supply power to the alternating current amplification circuit 40.

Figure 11A:
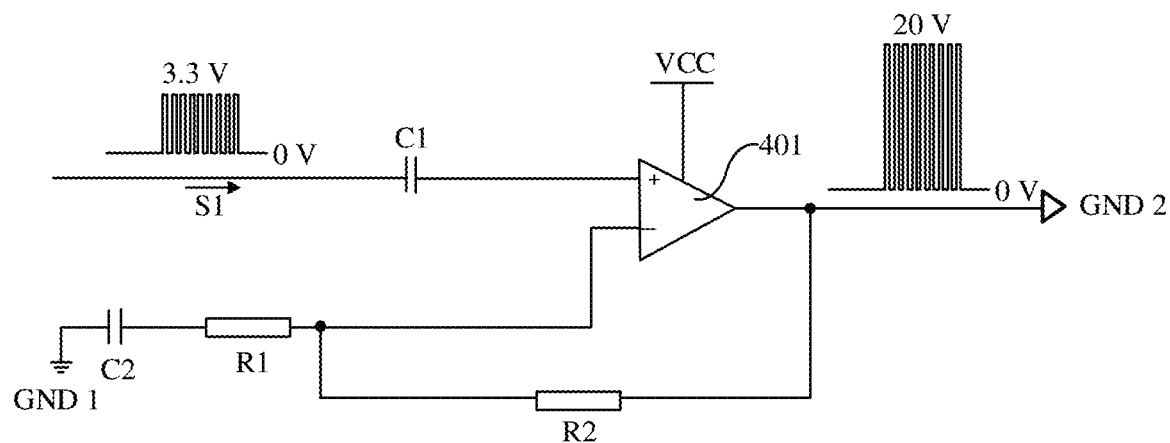
FIG. 11A is a schematic diagram of a structure of an isolation power supply circuit according to an embodiment of this application.

The alternating current amplification circuit 40 provided in this embodiment of this application may include an operational amplifier 401, a first capacitor C1, a second capacitor C2, a first resistor R1, and a second resistor R2 shown in FIG. 11A. A first end of the first capacitor C1 is electrically connected to the touch detection drive circuit 20 shown in FIG. 10, to receive the touch excitation signal S1 output by the touch detection drive circuit 20. A second end of the first capacitor C1 is electrically connected to a positive input end ("+") of the operational amplifier 401.

A first end of the first resistor R1 is electrically connected to a negative input end ("−") of the operational amplifier 401, and a second end of the first resistor R1 is electrically connected to a first end of the second capacitor C2. A second end of the second capacitor C2 is electrically connected to the first reference ground GND 1. A first end of the second resistor R2 is electrically connected to the negative input end ("−") of the operational amplifier 401, and a second end of the second resistor R2 is electrically connected to an output end of the operational amplifier 401. The output end of the operational amplifier 401 is electrically connected to the second reference ground GND 2, and a control end of the operational amplifier 401 is electrically connected to a voltage control end VCC.

In this case, the touch excitation signal S1 used as an alternating current signal may be transmitted to the positive input end ("+") of the operational amplifier 401 by using the first capacitor C1. The first resistor R1, the second resistor R2, and the second capacitor C2 may form an alternating current amplification unit, and the alternating current amplification unit can amplify a peak-to-peak voltage value (for example, 3.3 V) of the touch excitation signal S1 to R2/R1 times. Therefore, a peak-to-peak voltage value at the output end of the operational amplifier 401 can be close to a full scale of operational amplifying of the operational amplifier 401 (that is, a voltage value of the voltage control end VCC, for example, 20 V). In this way, the voltage of the second reference ground GND 2 can be raised to 20 V.

Figure 11B:
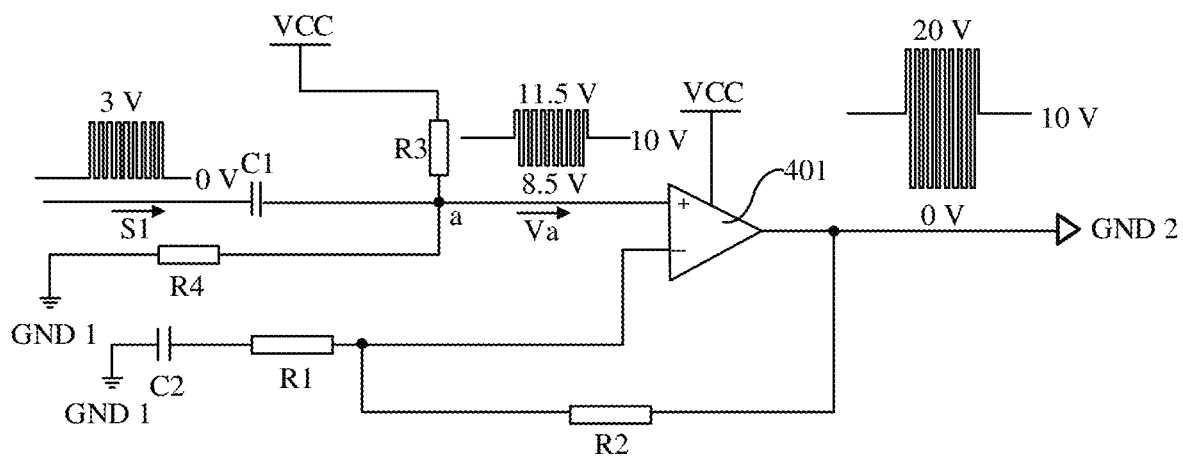
FIG. 11B is a schematic diagram of a structure of another isolation power supply circuit according to an embodiment of this application.

Alternatively, in some other embodiments of this application, the alternating current amplification circuit 40 may further have a voltage bias function. For example, as shown in FIG. 11B, the alternating current amplification circuit 40 may further include a third resistor R3 and a fourth resistor R4. A first end of the third resistor R3 is electrically connected to the voltage control end VCC, and a second end of the third resistor R3 is electrically connected to the positive input end ("+") of the operational amplifier 401. A first end of the fourth resistor R4 is electrically connected to the positive input end ("+") of the operational amplifier 401, and a second end of the fourth resistor R4 is electrically connected to the first reference ground GND 1. A resistance value of the third resistor R3 is the same as that of the fourth resistor R4.

In this way, under a voltage division action of the third resistor R3 and the fourth resistor R4, a center bias voltage Va may be generated at a center bias point a. For example, when the voltage value of the voltage control end VCC is 20 V, the center bias voltage Va may be 10 V. In this case, for example, the peak-to-peak voltage value of the touch excitation signal S1 is 3 V. When the touch excitation signal S1 used as an alternating current signal is superimposed on the positive input end ("+") of the operational amplifier 401 by using the first capacitor C1, a low level of a voltage at the positive input end ("+") of the operational amplifier 401 is 8.5 V (10 V−1.5 V=8.5 V), a high level is 11.5 V (10 V+1.5 V=8.5 V), and a center bias voltage Va is 10 V.

Based on this, similarly, under an amplification action that the first resistor R1, the second resistor R2, and the second capacitor C2 may form the alternating current amplification unit, the peak-to-peak voltage value at the output end of the operational amplifier 401 may be close to the full scale of operational amplifying of the operational amplifier 401 (that is, the voltage value of the voltage control end VCC, for example, 20 V). In this way, the voltage of the second reference ground GND 2 can be raised to 20 V. The center bias voltage Va is generated at the center bias point a by using the third resistor R3 and the fourth resistor R4, so that an operational amplification process of the operational amplifier 401 can be more stable.

On this basis, to enable the alternating current amplification circuit 40 to work normally, in addition to that the battery 60 needs to supply power to the alternating current amplification circuit 40 by using the first PMU 61, the alternating current amplification circuit 40 further needs to be electrically connected to the first reference ground GND 1 to implement grounding. It can be learned from the foregoing that the touch detection drive circuit 20 is electrically connected to the second reference ground GND 2 to implement grounding, and the touch excitation signal S1 output by the touch detection drive circuit 20 needs to be transmitted to the alternating current amplification circuit 40. In this case, to transmit a signal (that is, transmit the touch excitation signal S1) between the alternating current amplification circuit 40 and the touch detection drive circuit 20 that are connected to different grounds (the first reference ground GND 1 and the second reference ground GND 2), in some embodiments of this application, as shown in FIG. 10, the electronic device 01 may further include a first isolation element 51.

The first isolation element 51 is coupled between the touch detection drive circuit 20 and the alternating current amplification circuit 40 and between the touch detection drive circuit 20 and the isolation power supply circuit 30. The first isolation element 51 is further electrically connected to the first reference ground GND 1 and the second reference ground GND 2 and is configured to couple, to the alternating current amplification circuit 40 and the isolation power supply circuit 30, the touch excitation signal S1 output by the touch detection drive circuit 20.

Figure 12:
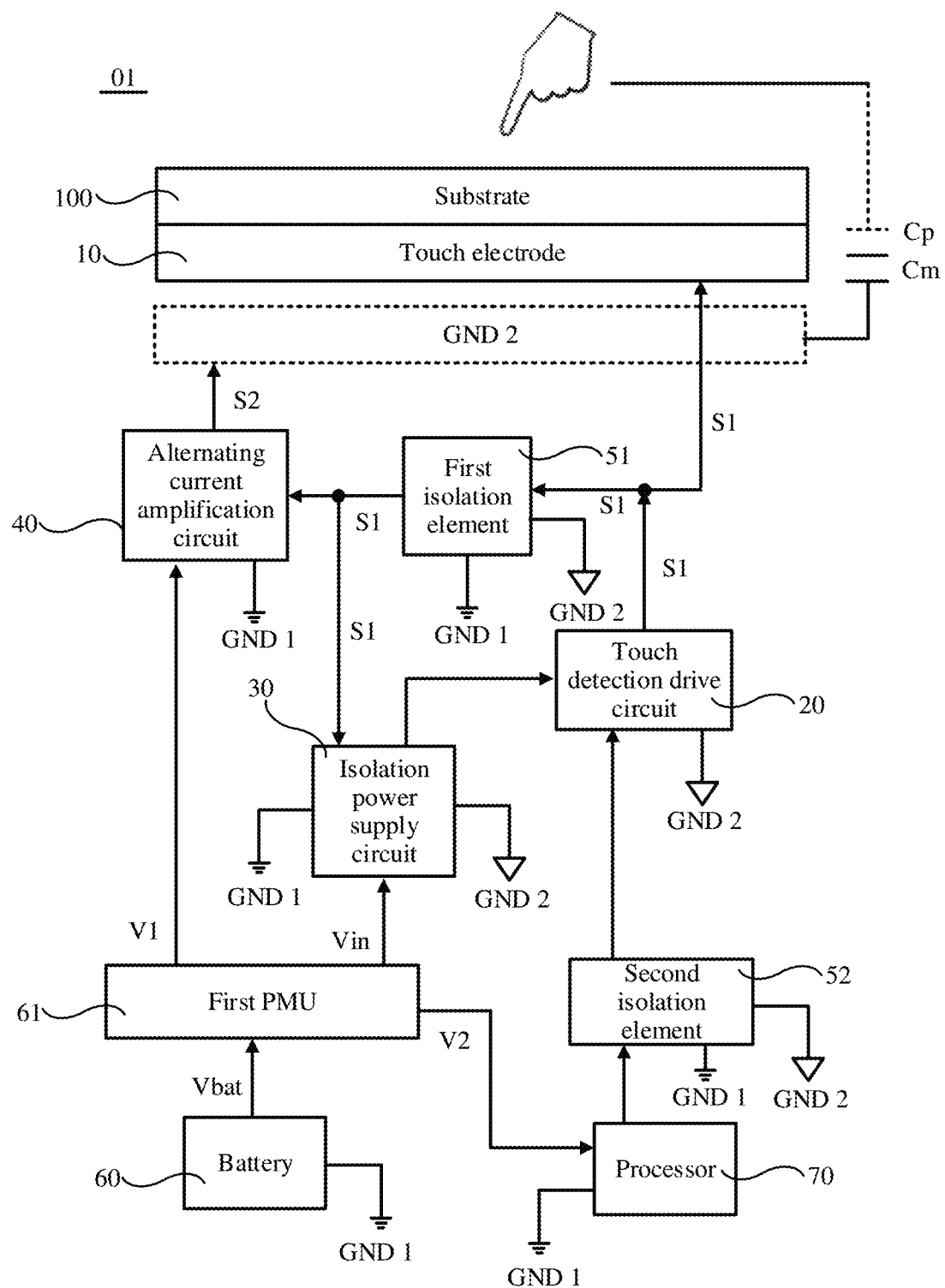
FIG. 12 is a schematic diagram of a structure of another electronic device according to an embodiment of this application.

In addition, as shown in FIG. 12, the electronic device 01 may further include a processor 70. The processor 70 may be a central processing unit (central processing unit, CPU) or a system on a chip (system on a chip, SOC). The first PMU 61 may convert the battery voltage Vbat of the battery 60 into a working voltage V2 of the processor 70. The processor 70 may receive a detection result of the touch detection drive circuit 20, and determine a touch position of the finger, a gesture type, and the like based on the detection result. In addition, the processor 70 may further output a control signal to the touch detection drive circuit 20, to control a touch detection process of the touch detection drive circuit 20.

The processor 70 needs to be electrically connected to the first reference ground GND 1 to implement grounding. It can be learned from the foregoing that the touch detection drive circuit 20 is electrically connected to the second reference ground GND 2 to implement grounding. In this case, to transmit a signal between the processor 70 and the touch detection drive circuit 20 that are connected to different grounds (the first reference ground GND 1 and the second reference ground GND 2), in some embodiments of this application, as shown in FIG. 12, the electronic device 01 may further include a second isolation element 52. The second isolation element 52 is coupled between the processor 70 and the touch detection drive circuit 20. The second isolation element 52 is electrically connected to the first reference ground GND 1 and the second reference ground GND 2 and is configured to: couple, to the touch detection drive circuit 20, a control signal that is output by the processor 70, and couple a touch detection result obtained by the touch detection drive circuit 20 to the processor 70.

Figure 13A:
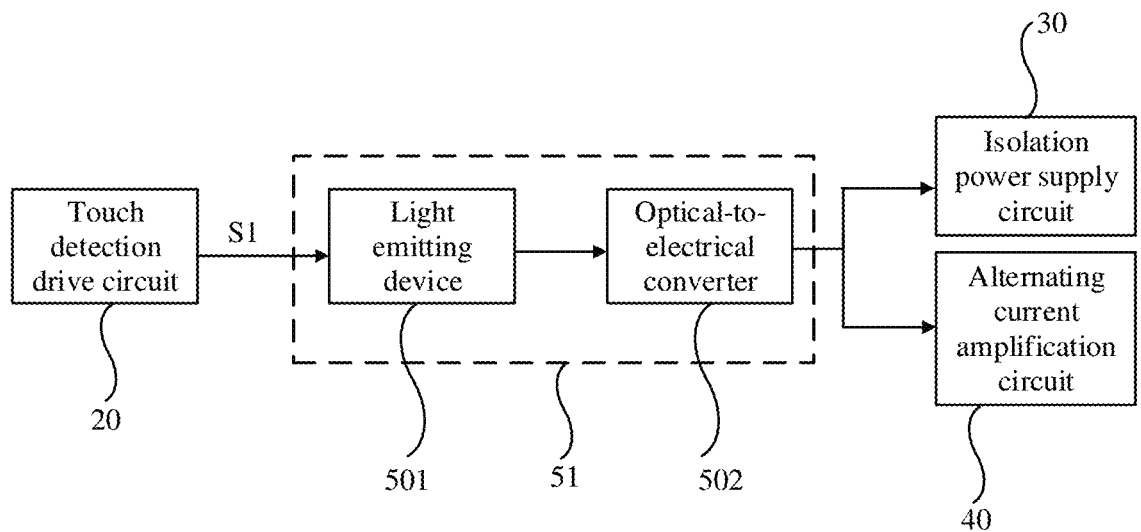
FIG. 13A is a schematic diagram of a structure of a first isolation element according to an embodiment of this application.

In some embodiments of this application, as shown in FIG. 13A, a structure of the first isolation element 51 may include a light emitting device 501 and an optical-to-electrical converter 502. The light emitting device 501 may be electrically connected to the touch detection drive circuit 20 and is configured to convert the touch excitation signal S1 from the touch detection drive circuit 20 into an optical signal. The optical-to-electrical converter 502 may be electrically connected to the alternating current amplification circuit 40 and the isolation power supply circuit 30 and is configured to convert the optical signal into an electrical signal and transmit the electrical signal to the alternating current amplification circuit 40 and the isolation power supply circuit 30. In this case, the first isolation element 51 performs signal coupling transmission through optical coupling. The light emitting device 501 may be a light emitting diode or a laser transmitter.

Figure 13B:
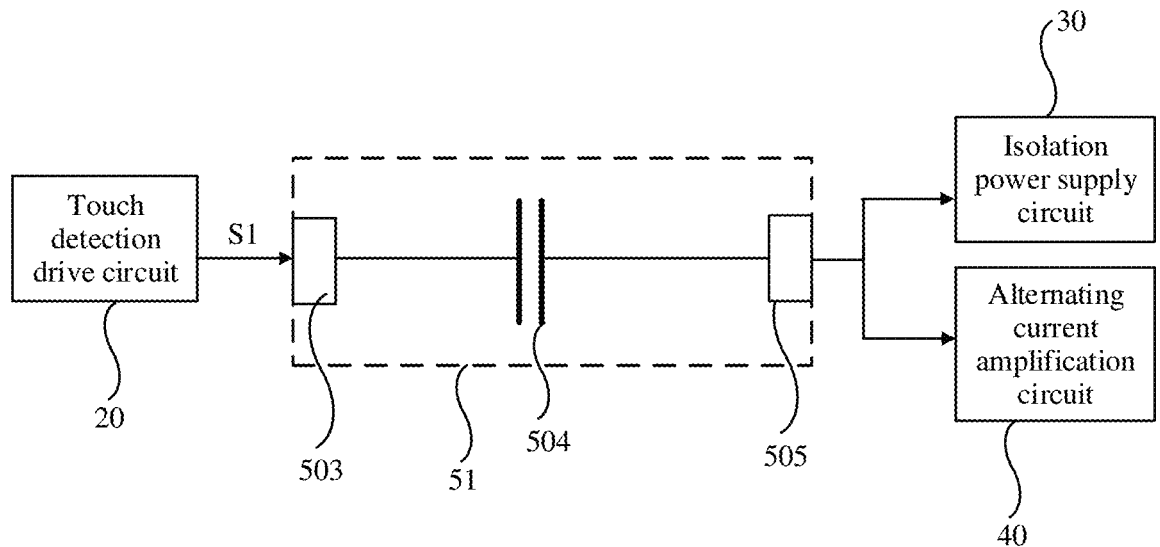
FIG. 13B is a schematic diagram of a structure of another first isolation element according to an embodiment of this application.

Alternatively, in some other embodiments of this application, as shown in FIG. 13B, a structure of the first isolation element 51 may include a signal input interface 503, an isolation capacitor 504, and a signal output interface 505. The signal input interface 503 is electrically connected to the touch detection drive circuit 20 and is configured to receive the touch excitation signal S1 from the touch detection drive circuit 20. A first end of the isolation capacitor 504 is electrically connected to the signal input interface 503, and a second end of the isolation capacitor 504 is electrically connected to the signal output interface 505. The isolation capacitor 504 is configured to transmit, through the signal output interface 505, the touch excitation signal S1 received by the signal input interface 503 to the alternating current amplification circuit 40 and the isolation power supply circuit 30. In this case, the first isolation element 51 performs signal coupling transmission through capacitive coupling.

Figure 13C:
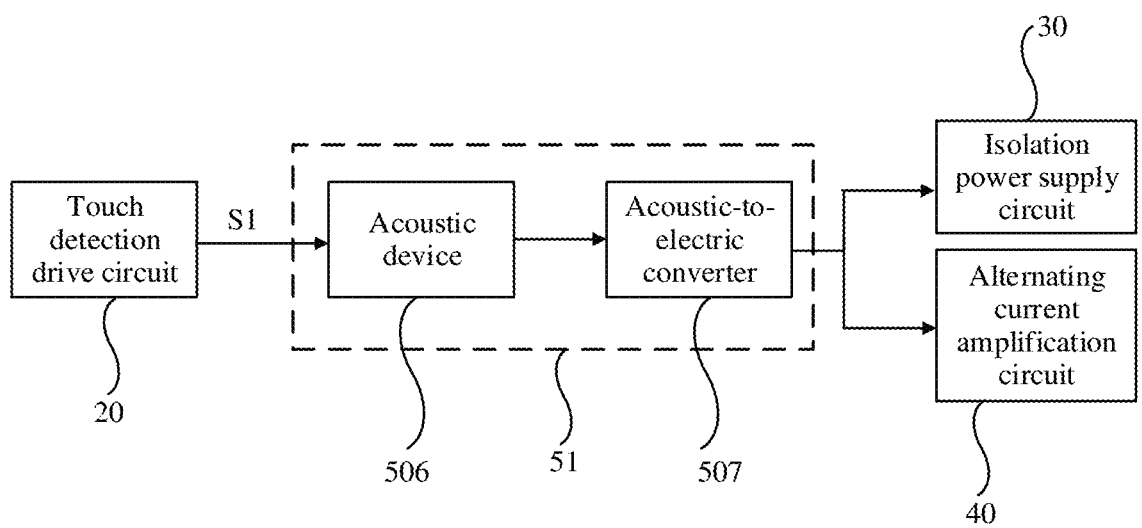
FIG. 13C is a schematic diagram of a structure of another first isolation element according to an embodiment of this application.

Alternatively, in some other embodiments of this application, as shown in FIG. 13C, a structure of the first isolation element 51 may include an acoustic device 506 and an acoustic-to-electric converter 507. The acoustic device 506 is electrically connected to the touch detection drive circuit 20 and is configured to convert the touch excitation signal S1 from the touch detection drive circuit 20 into a sound signal. The acoustic-to-electric converter 507 is electrically connected to the alternating current amplification circuit 40 and the isolation power supply circuit 30 and is configured to convert the sound signal into an electrical signal and transmit the electrical signal to the alternating current amplification circuit 40 and the isolation power supply circuit 30. In this case, the first isolation element 51 performs signal coupling transmission through sound coupling.

In addition, in some other embodiments of this application, the first isolation element 51 may further include a transformer. A primary-side winding of the transformer is electrically connected to the touch detection drive circuit 20, and a secondary-side winding is electrically connected to the alternating current amplification circuit 40, so that signal coupling transmission is performed through electromagnetic coupling of the transformer.

It should be noted that the foregoing description is provided by using the structure of the first isolation element 51 as an example. A structure of the second isolation element 62 may be obtained in the same way, and details are not described herein again.

Figure 14:
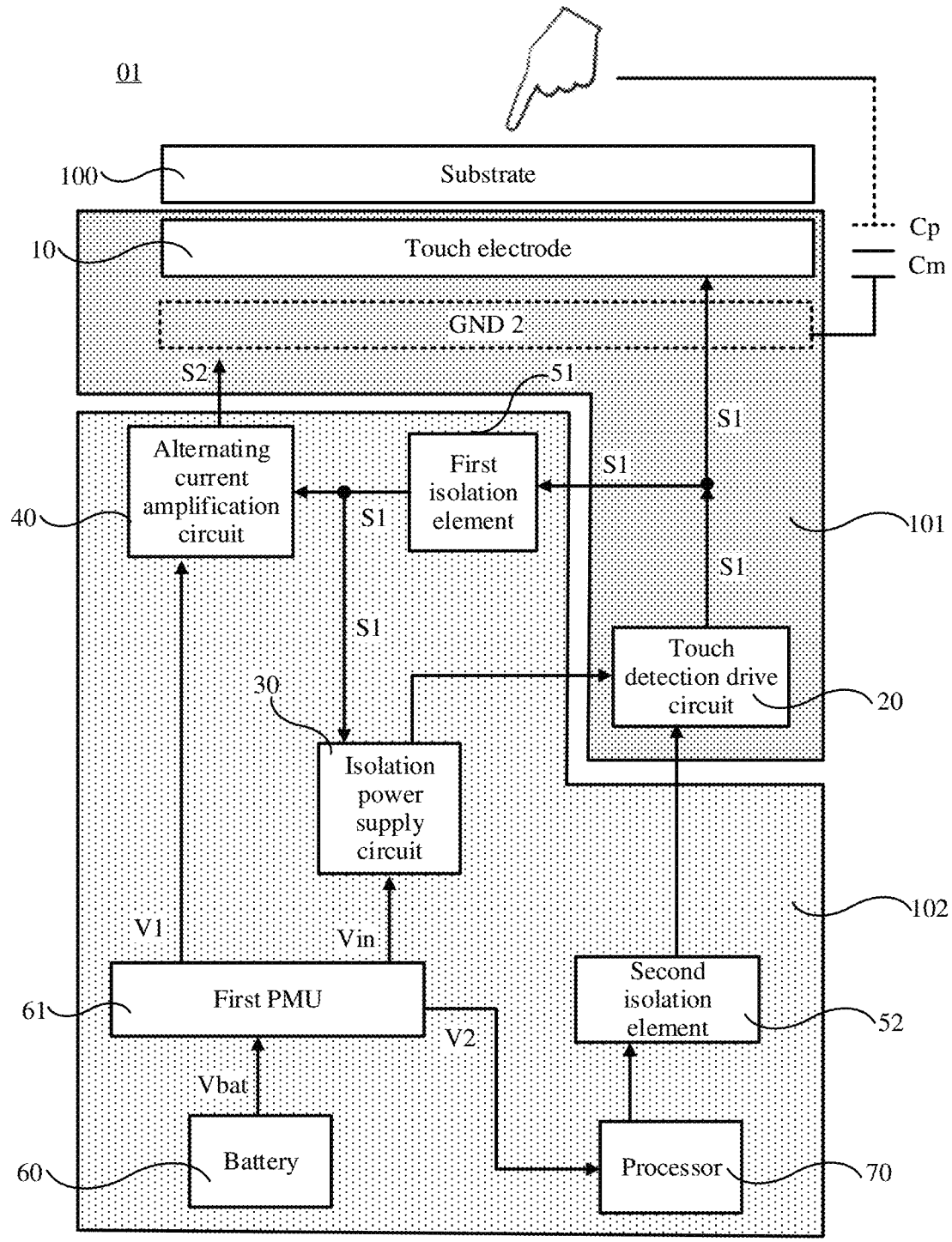
FIG. 14 is a schematic diagram of a structure of another electronic device according to an embodiment of this application.

On this basis, to enable the touch detection drive circuit 20 to be grounded by using the second reference ground GND 2 after being disconnected from the first reference ground GND 1, and other control circuits in the electronic device 01, for example, the processor 70, the isolation power supply circuit 30, the alternating current amplification circuit 40, the first isolation element 51, the second isolation element 52, and the first PMU 61 are all grounded by using the first reference ground GND 1 during working, as shown in FIG. 14, the electronic device 01 may further include a first circuit board 101 and a second circuit board 102. Both the first circuit board 101 and the second circuit board 102 may be PCBs. The PCB may include a plurality of layers of copper foil and a dielectric layer disposed between any two adjacent layers of copper foil.

Based on this, the second reference ground GND 2 may be disposed in the first circuit board 101. For example, one layer of copper foil in the first circuit board 101 may be used as a reference ground plane on which the second reference ground GND 2 is located. In this case, as shown in FIG. 14, the touch detection drive circuit 20 may be disposed on the first circuit board 101, so that the touch detection drive circuit 20 can be electrically connected to the second reference ground GND 2 to implement grounding.

In addition, the first reference ground GND 1 may be disposed in the second circuit board 102. For example, one layer of copper foil in the second circuit board 102 may be used as a reference ground plane on which the first reference ground GND 1 is located. In this case, as shown in FIG. 14, other control circuits in the electronic device 01, for example, the processor 70, the isolation power supply circuit 30, the alternating current amplification circuit 40, the first isolation element 51, the second isolation element 52, and the first PMU 61, may be disposed on the second circuit board 102, so that the other control circuits can be electrically connected to the first reference ground GND 1 to implement grounding.

It should be noted that, as shown in FIG. 12, the isolation power supply circuit 30, the first isolation element 51, and the second isolation element 52 are all electrically connected to the first reference ground GND 1 and the second reference ground GND 2. Therefore, in some embodiments of this application, as shown in FIG. 14, the isolation power supply circuit 30, the first isolation element 51, and the second isolation element 52 may be disposed on the second circuit board 102, so that the isolation power supply circuit 30, the first isolation element 51, and the second isolation element 52 are directly electrically connected to the first reference ground GND 1 in the second circuit board 102, and are electrically connected to the second reference ground GND 2 in the first circuit board 101 through cabling.

Alternatively, in some other embodiments of this application, the isolation power supply circuit 30, the first isolation element 51, and the second isolation element 52 may be disposed on the first circuit board 101, so that the isolation power supply circuit 30, the first isolation element 51, and the second isolation element 52 are directly electrically connected to the second reference ground GND 2 in the first circuit board 101, and are electrically connected to the first reference ground GND 2 in the second circuit board 102 through cabling. For ease of description, the following uses an example in which the isolation power supply circuit 30, the first isolation element 51, and the second isolation element 52 are disposed on the second circuit board 102 for description.

Alternatively, in some other embodiments of this application, the processor 70 and the touch detection drive circuit 20 may be disposed on the first circuit board 101. In this case, both the processor 70 and the touch detection drive circuit 20 may be electrically connected by using the second reference ground GND 2 in the first circuit board 101 to implement grounding. In this case, the processor 70 and the touch detection drive circuit 20 are electrically connected to a same reference ground, that is, the second reference ground GND 2. Therefore, the second isolation element 52 does not need to be disposed between the processor 70 and the touch detection drive circuit 20. In addition, another circuit structure such as a Bluetooth circuit electrically connected to the processor 70 may also be disposed together with the processor 70 in the first circuit board 101.

Figure 15A:
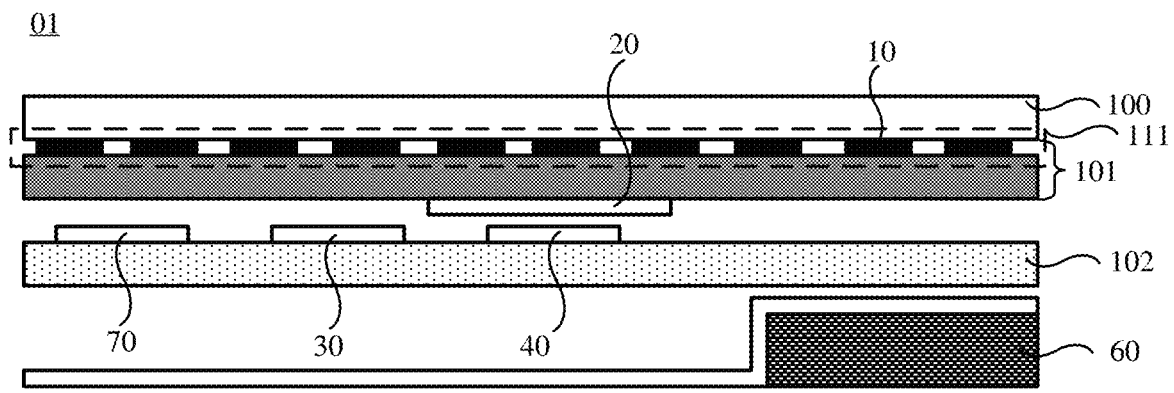
FIG. 15A is a schematic diagram of a sectional structure of an electronic device according to an embodiment of this application.

In some embodiments of this application, as shown in FIG. 15A, the first circuit board 101 and the second circuit board 102 may be stacked. Compared with the second circuit board 102, the first circuit board 101 is disposed closer to the cover 100. It can be learned from the foregoing that the first circuit board 101 includes a plurality of layers of copper foil, where one layer of copper foil closest to the cover 100 in the plurality of layers of copper foil 101 may be referred to as first copper foil 111. When the electronic device 01 is a touchpad without a display function, and the touchpad employs a self-capacitance touch manner, the first copper foil 111 may include a plurality of block-shaped touch electrodes 10 disposed at intervals. In this way, the touch electrode 10 may be manufactured by using one layer of copper foil in the first circuit board 101. The touch electrode 10 may be connected to the cover 100 by using an adhesive layer.

Figure 15B:
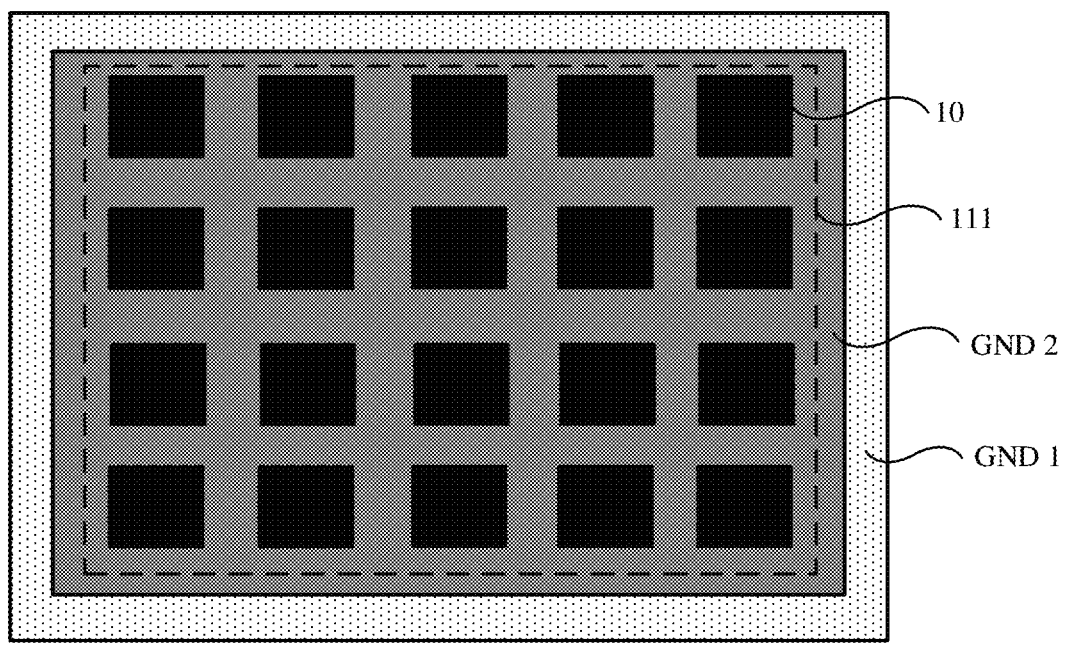
FIG. 15B is a schematic diagram of a touch electrode, a first reference ground, and a second reference ground according to an embodiment of this application.

It can be learned from the foregoing that, one layer of copper foil in the first circuit board 101 may be used as the reference ground plane on which the second reference ground GND 2 is located, and one layer of copper foil in the second circuit board 102 may be used as the reference ground plane on which the first reference ground GND 1 is located. In this case, when the first circuit board 101 and the second circuit board 102 are stacked, as shown in FIG. 15B (a top view of FIG. 15A), the second reference ground GND 2 and the first reference ground GND 1 may be stacked. Vertical projections of the plurality of touch electrodes 10 (taking the self-capacitance electrode as an example) composed of the first copper foil 111 in the first circuit board on the second reference ground GND 2 are all located in the plane on which the second reference ground GND 2 is located.

Figure 15C:
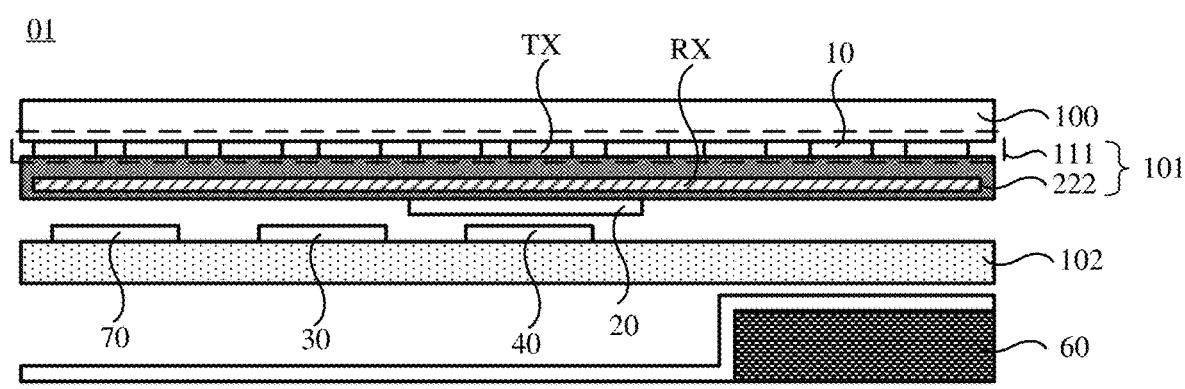
FIG. 15C is a schematic diagram of a sectional structure of another electronic device according to an embodiment of this application.

Alternatively, when the touchpad employs a mutual-capacitance touch manner, as shown in FIG. 15C (a sectional view obtained by cutting along a dashed line O-O in FIG. 6A), the first circuit board 101 may include the first copper foil 111 and second copper foil 222 that are stacked and insulated, and there is an insulation layer between the first copper foil 111 and the second copper foil 222. The first copper foil 111 may include the foregoing plurality of transmit electrodes TX. The second copper foil 222 may include the foregoing plurality of receive electrodes RX. As shown in FIG. 15C, the cover 100 may be connected to the plurality of transmit electrodes TX by using an adhesive layer. In this case, the first copper foil 111 is copper foil closest to the cover 100 in the first circuit board 101. Alternatively, the cover 100 may be connected to the plurality of receive electrodes RX by using an adhesive layer. In this case, the second copper foil 222 is copper foil closest to the cover 100 in the first circuit board 101.

On this basis, as shown in FIG. 15A or FIG. 15C, the touch detection drive circuit 20 may be disposed on a side surface that is of the first circuit board 101 and that is away from the cover 100. In addition, other control circuits in the electronic device 01, for example, the processor 70, the isolation power supply circuit 30, and the alternating current amplification circuit 40, may be disposed on a side surface that is of the second circuit board 102 and that is close to the first circuit board 101, or may be disposed on a side surface that is of the second circuit board 102 and that is away from the first circuit board 101. Other control circuits (for example, the processor 70, the isolation power supply circuit 30, and the alternating current amplification circuit 40) on the second circuit board 101 may be electrically connected to the touch detection drive circuit 20 on the first circuit board 101 by using an inter-board connector, a flat cable, or the like. In addition, the battery 60 disposed on a side that is of the second circuit board 102 and that is away from the first circuit board 101 may supply power to the foregoing control circuit.

In this way, the first circuit board 101 and the second circuit board 102 are disposed, so that the touch detection drive circuit 20 and other control circuits (for example, the processor 70, the isolation power supply circuit 30, and the alternating current amplification circuit 40) in the electronic device can be disposed on different circuit boards. In this case, in a process of attaching the first circuit board 101 to the cover 100 by using a large quantity of double-sided tapes, faults of the foregoing other control circuits in the attaching process can be reduced, and it is beneficial to test the touch detection drive circuit 20 on the first circuit board 101. In addition, because there are usually a relatively large quantity of touch electrodes 10 in the electronic device 01, for example, 400 touch electrodes, there are also a relatively large quantity of signal cables used to electrically connect the touch electrodes 10 and the touch detection drive circuit 20. Therefore, the touch detection drive circuit 20 and the touch electrode 10 need to be disposed on a same circuit board, thereby facilitating connection of the foregoing signal cables.

Figures 1, 16A:
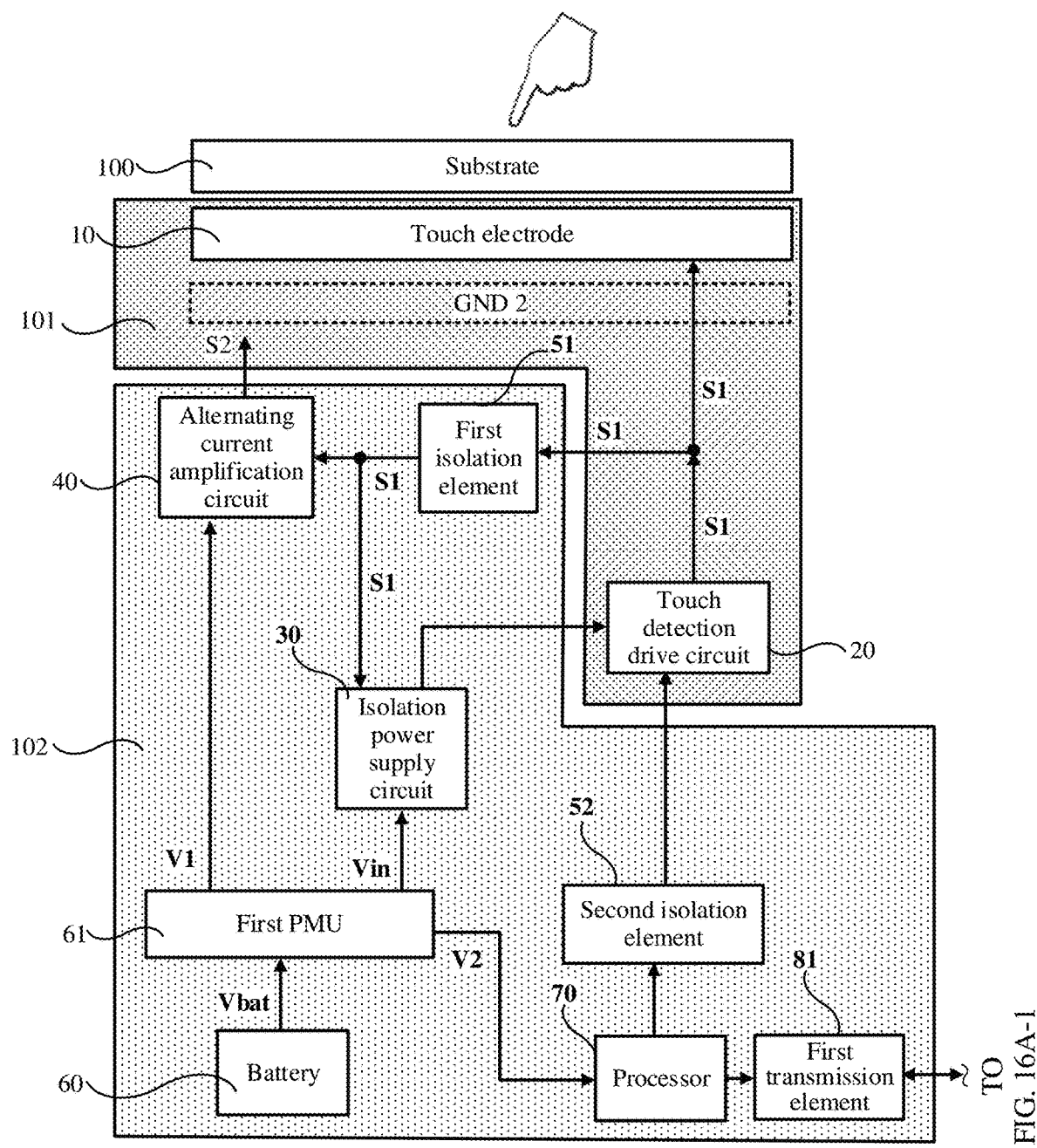
Figures 2, 16A:
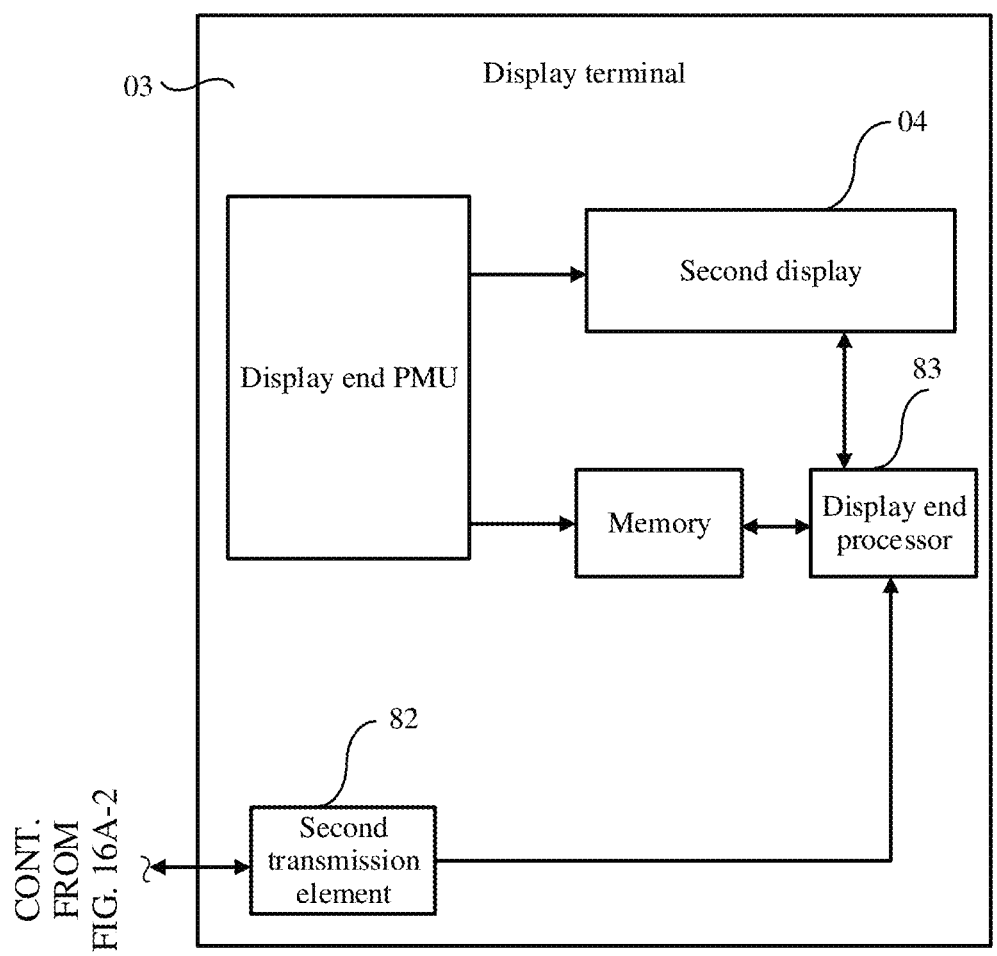
Figure 16B:
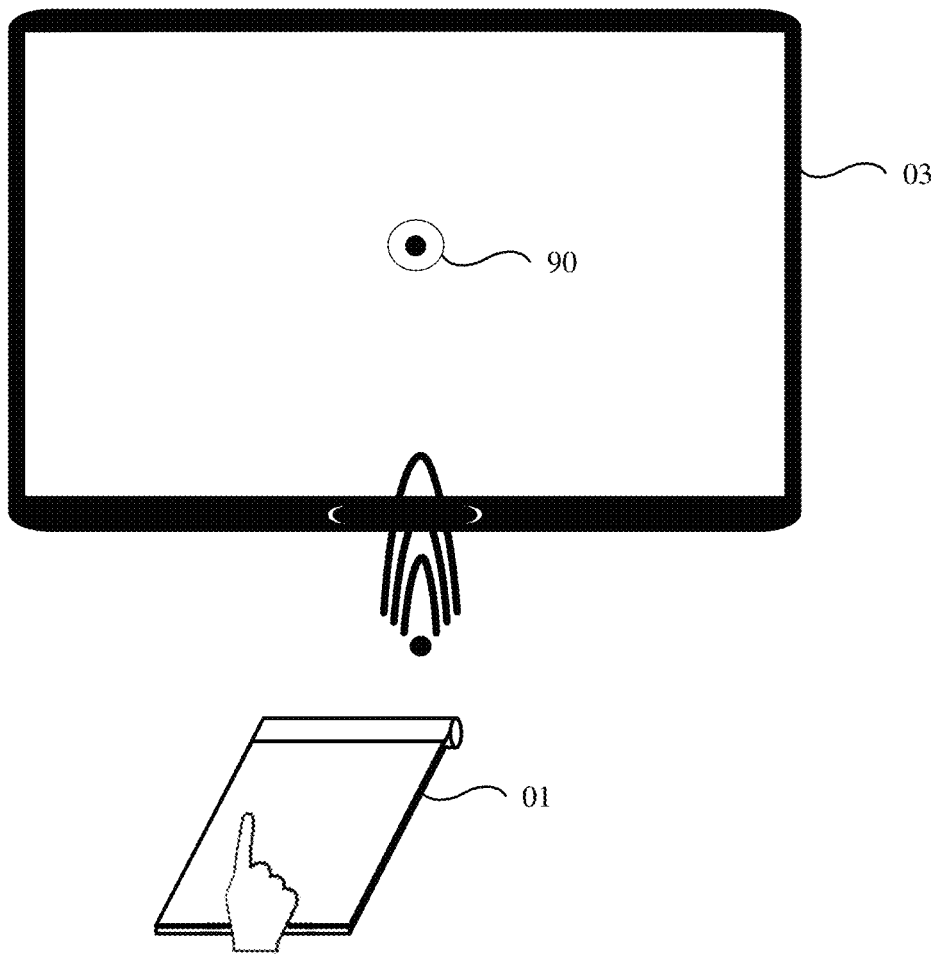
FIG. 16B is a schematic diagram of a touch manner of a touch system according to an embodiment of this application.

In this case, when the touch system includes the electronic device 01 used as the touchpad and a display terminal 03 shown in FIG. 16A-1 and FIG. 16A-2, the electronic device may further include a first transmission element 81. The first transmission element 81 may be electrically connected to a second transmission element 82 of the display terminal 03 in a wired or wireless (as shown in FIG. 16B) manner. In this case, the processor 70 in the electronic device may calculate touch coordinate data of the finger of the user based on the detection result of the touch detection drive circuit 20, and transmit the touch coordinate data to the second transmission element 82 by using the first transmission element 81. Then, a display end processor 83 parses the touch coordinate data, and controls a second display 04 in the display terminal 03 to display a cursor 90 shown in FIG. 16B. In addition, a display end PMU in FIG. 16A-1 and FIG. 16A-2 is configured to supply power to the second display 04, the display end processor 83, and a memory. The memory is configured to store information output by the display end processor 83.

In this case, as shown in FIG. 16B, in a process in which the finger of the user operates the electronic device 01 (that is, the touchpad) through hovering touch, the user may obtain a touch position of the finger in a display image of the display terminal 03 by staring at the display terminal 03 with two eyes. Therefore, a touch operation can be implemented when there is a specific distance from the display terminal with a large screen.

Figure 17:
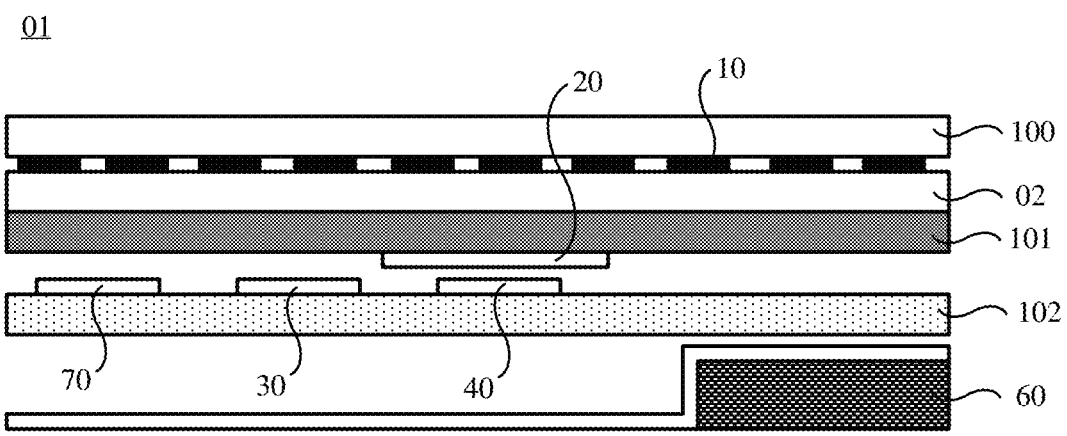
FIG. 17 is a schematic diagram of a sectional structure of another electronic device according to an embodiment of this application.

Alternatively, in some other embodiments of this application, as shown in FIG. 17, when the electronic device 01 has the first display 02 for displaying an image, the touch electrode 10 may be disposed between the first display 02 and the cover 100. The touch electrode 10 may include the foregoing self-capacitance electrode. Alternatively, the touch electrode 10 may include the transmit electrode TX and the receive electrode RX that are stacked.

In this case, the electronic device 01 may include the first circuit board 101 and the second circuit board 102 that are stacked. The second reference ground GND 2 is disposed in the first circuit board 101, and the touch detection drive circuit 20 may be disposed on a side surface that is of the first circuit board 101 and that is away from the cover 100. The first reference ground GND 1 may be disposed in the second circuit board 102. Other control circuits in the electronic device 01, for example, the processor 70, the isolation power supply circuit 30, the alternating current amplification circuit 40, the first isolation element 51, the second isolation element 52, and the first PMU 61, are disposed on the second circuit board 102. In this case, the electronic device 01 may be a mobile phone, an intelligent wearable product, or a tablet computer.

It can be learned from the foregoing that, in the non-touch phase P2, the isolation power supply circuit 30 can short-circuit the first reference ground GND 1 and the second reference ground GND 2, and transmit the primary power supply voltage Vin provided by the first PMU 61 to the touch detection drive circuit 20, to drive the touch detection drive circuit 20 to work to output the touch excitation signal S1. In addition, the primary power supply voltage Vin is stored to implement energy storage. In addition, in the touch phase P1, the isolation power supply circuit 30 can disconnect the first reference ground GND 1 from the second reference ground GND 2, and discharge to the touch detection drive circuit 20, to drive the touch detection drive circuit 20 to work to output the touch excitation signal S1. The following describes in detail a specific structure of the isolation power supply circuit 30 that can implement the foregoing function.

Figure 18:
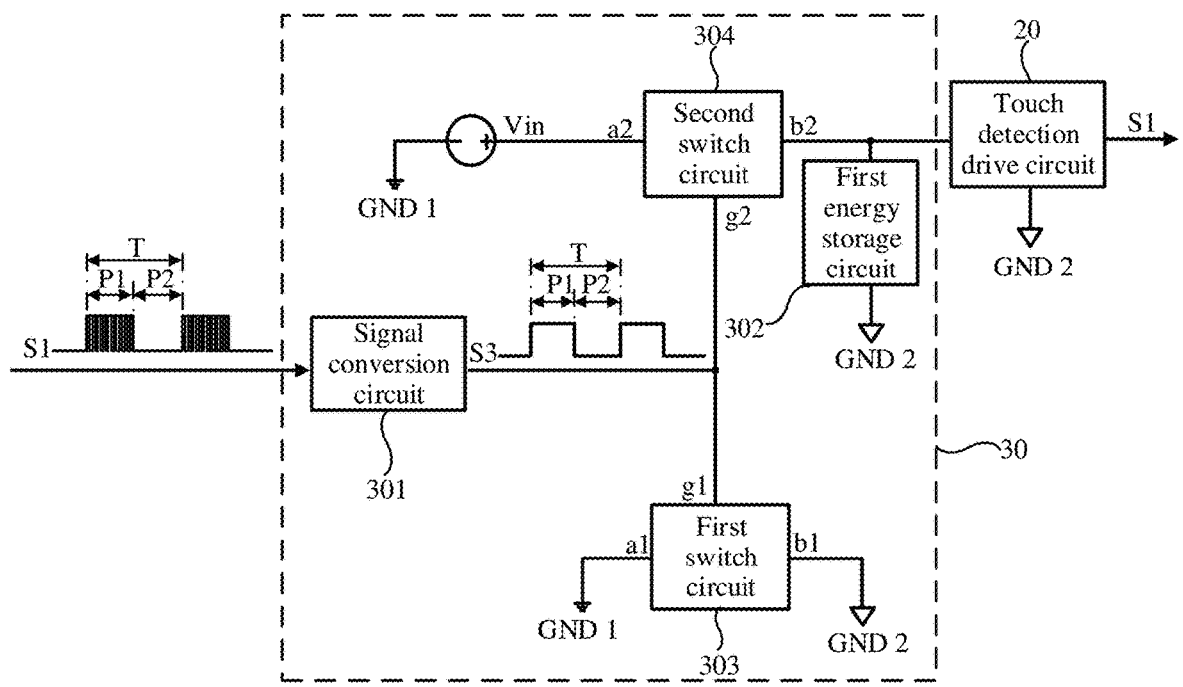
FIG. 18 is a schematic diagram of a structure of an isolation power supply circuit according to an embodiment of this application.

For example, in some embodiments of this application, as shown in FIG. 18, the isolation power supply circuit 30 may include a signal conversion circuit 301, a first energy storage circuit 302, a first switch circuit 303, and a second switch circuit 304.

The signal conversion circuit 301 is configured to: receive the touch excitation signal S1, and filter out a high frequency part (an area in which square waves are relatively dense in FIG. 18, where a frequency may be greater than 100 kHz) in the touch excitation signal S1, to generate a sampling signal S3. A low frequency part of the sampling signal S3 still has the foregoing sampling period T (including the touch phase P1 and the non-touch phase P2).

FIG. 18 is described by using an example in which a low frequency part of the touch excitation signal S1 and the sampling signal S3 are at a high level in the touch phase P1 and at a low level in the non-touch phase P2. In this case, in some embodiments of this application, a structure of the signal conversion circuit 301 may be shown in FIG. 19A, including a diode 311, a second energy storage circuit 321, a third switch circuit 331, and a phase inverter 341.

Figure 19A:
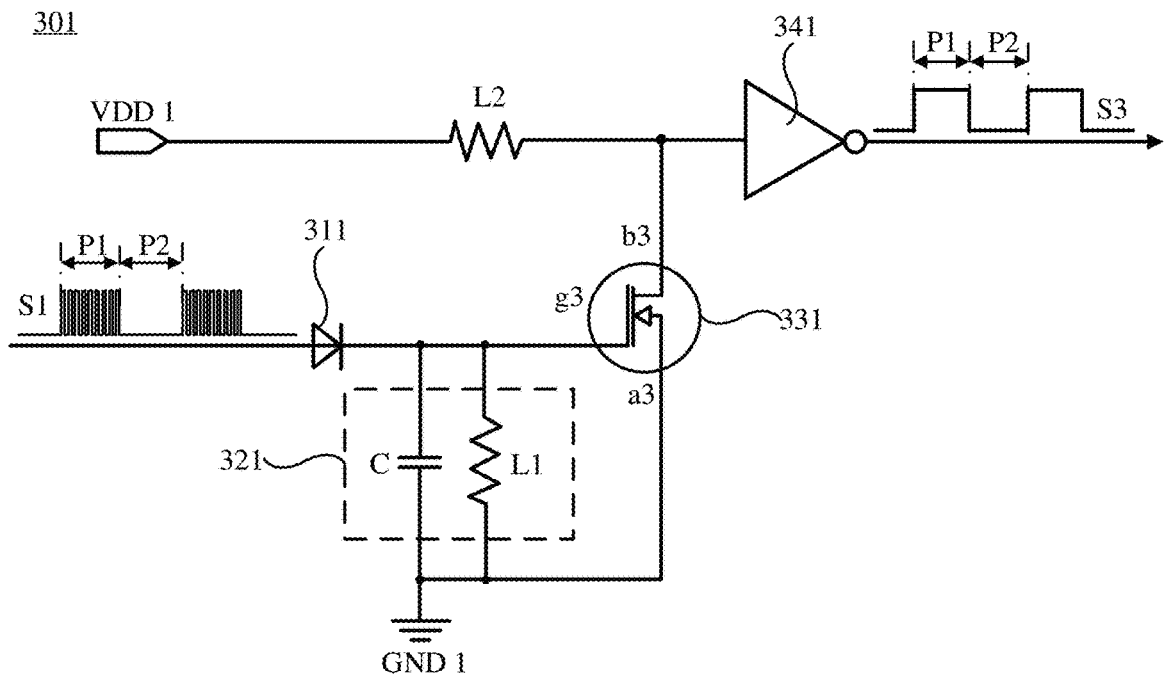
FIG. 19A is a schematic diagram of a structure of the signal conversion circuit shown in FIG. 18.

An input end of the diode 311 is configured to receive the touch excitation signal S1. It can be learned from the foregoing that the first isolation element 51 is coupled between the touch detection drive circuit 20 and the isolation power supply circuit 30. In this case, the isolation power supply circuit 30 may be electrically connected to the first isolation element 51 shown in FIG. 12 by using the input end of the diode 311 in the signal conversion circuit 301. In this way, the input end of the diode 311 may receive the touch excitation signal S1 by using the first isolation element 51. In addition, the second energy storage circuit 321 may be electrically connected to an output end of the diode 311 and the first reference ground GND 1. For example, as shown in FIG. 19A, the second energy storage circuit 321 may include a capacitor C and an inductor L1.

A control end g3 of the third switch circuit 331 may be electrically connected to the output end of the diode 311 and the second energy storage circuit 321. A first end a3 of the third switch circuit 331 may be electrically connected to the first reference ground GND 1. A second end b3 of the third switch circuit 331 may be electrically connected to a control end g1 of the first switch circuit 303 and a control end g2 of the second switch circuit 304 (as shown in FIG. 18). The third switch circuit 311 is configured to: disconnect the control end g1 of the first switch circuit 303 and the control end g2 of the second switch circuit 304 from the first reference ground GND 1 in a cut-off state in the non-touch detection phase P2, where in this case, a voltage of a first voltage end VDD 1 is transmitted to the control end g1 of the first switch circuit 303 and the control end g2 of the second switch circuit 304; and short-circuit the control end g1 of the first switch circuit 303 and the control end g2 of the second switch circuit 304 to the first reference ground GND 1 in a conducting state in the touch detection phase P1.

In addition, the phase inverter 341 may be electrically connected between the second end b3 of the third switch circuit 331 and the control end g1 (as shown in FIG. 18) of the first switch circuit 303, and is electrically connected between the second end b3 of the third switch circuit 331 and the control end g2 (as shown in FIG. 18) of the second switch circuit 304.

For example, a signal conversion process of the signal conversion circuit 301 is described by using an example in which the third switch circuit 331 is an N-channel metal oxide semiconductor (negative channel metal oxide semiconductor, NMOS).

In the touch detection phase P1, when the touch excitation signal S1 is a high level shown in FIG. 19A, the high level is transmitted to a control end of the NMOS transistor (that is, the third switch circuit 331) by using the diode 311, to control the NMOS transistor to be conducted, and therefore the first voltage end VDD 1 is short-circuited to the first reference ground GND 1. In addition, the capacitor C and the inductor L1 in the second energy storage circuit 321 may store the high level. In this case, an input end of the phase inverter 341 receives a low level of the first reference ground GND 1, performs reverse processing on the low level of the first reference ground GND 1, and then outputs the low level. Therefore, a high level is output from the phase inverter 341 in this case, that is, the sampling signal S3 is at a high level in this case.

In addition, in a process in which the touch excitation signal S1 decreases from a high level to a low level, the second energy storage circuit 321 may keep the NMOS transistor to be conducted. In the touch detection phase P1, a frequency of the touch excitation signal S1 is very high (for example, about 300 kHz). Therefore, before discharging of the second energy storage circuit 321 ends, the touch excitation signal S1 quickly changes from a low level to a high level, so that the NMOS transistor continues to be conducted. In this way, in the entire touch detection phase P1, the sampling signal S3 remains at a high level.

In the non-touch detection phase P2, when the touch excitation signal S1 is at a low level, the low level is transmitted to the control end of the NMOS transistor (that is, the third switch circuit 331) by using the diode 311, to control the NMOS transistor to be cut off. In this case, a high level output by the first voltage end VDD 1 is transmitted to the input end of the phase inverter 341 after freewheeling of the inductor L2. The phase inverter 341 performs reverse processing on the high level and then outputs the high level. Therefore, the phase inverter 341 outputs a low level in this case, that is, the sampling signal S3 is at a low level in this case. In this way, a waveform of the obtained sampling signal S3 is the same as a waveform of a low frequency part of the touch excitation signal S1.

Figure 19B:
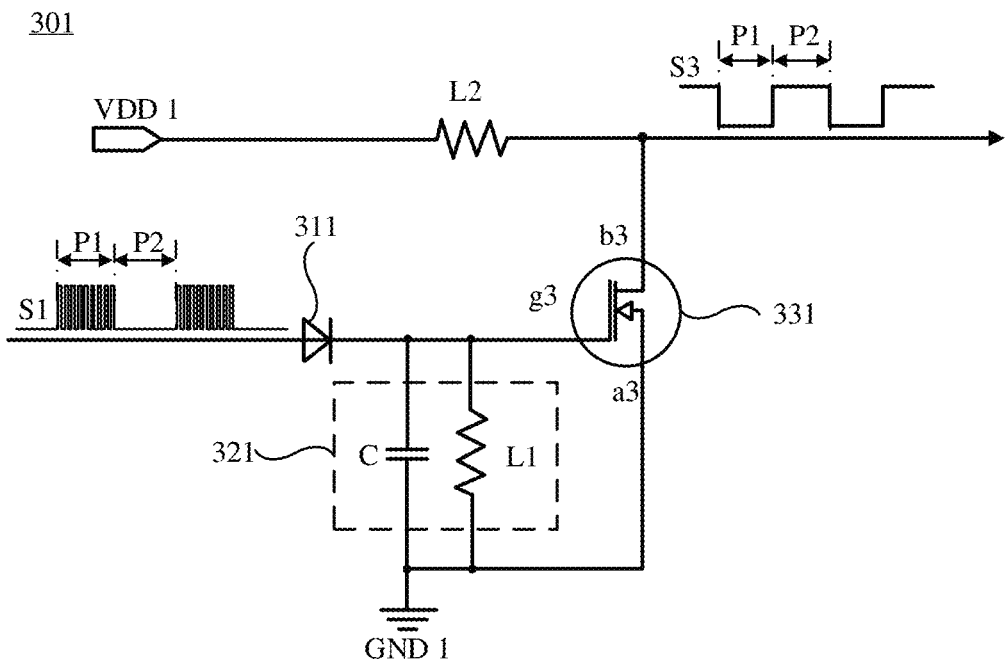
FIG. 19B is a schematic diagram of a structure of the signal conversion circuit shown in FIG. 18.

Alternatively, in some other embodiments of this application, a structure of the signal conversion circuit 301 formed by removing the phase inverter 341 is shown in FIG. 19B. In this case, in the touch detection phase P1, the third switch circuit 311 is in a cut-off state, and after freewheeling of the inductor L2, the high level output by the first voltage end VDD 1 is directly provided for the first switch circuit 303 and the second switch circuit 304. In this case, the sampling signal S3 is at a high level. In the non-touch detection phase P2, the third switch circuit 311 is in a conducting state, and the first voltage end VDD 1 and the first reference ground GND 1 are short-circuited. In this case, the sampling signal S3 is at a low level. Therefore, the waveform of the obtained sampling signal S3 is opposite to the waveform of the low frequency part of the touch excitation signal S1.

Figure 19C:
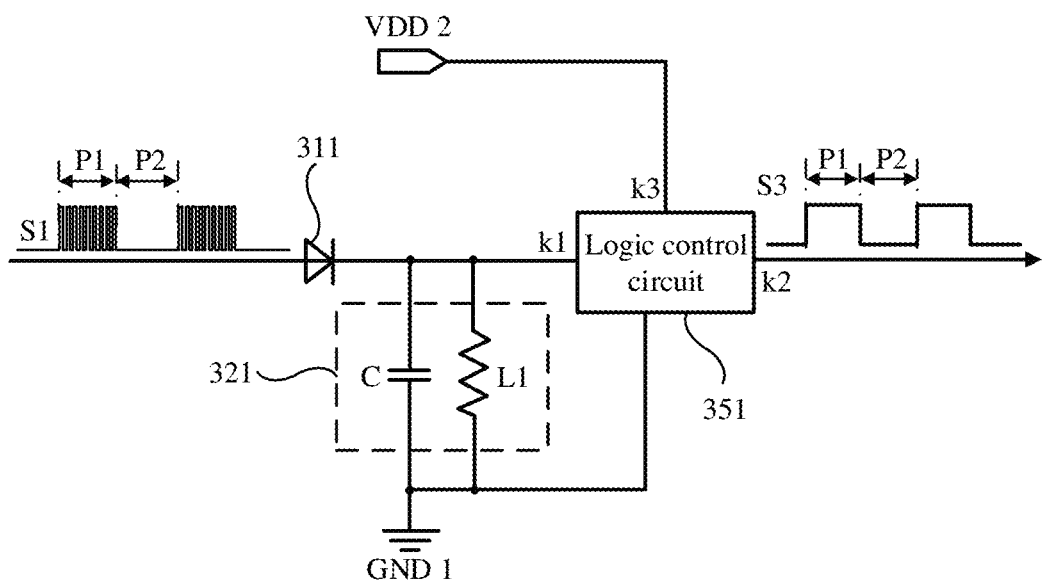
FIG. 19C is a schematic diagram of a structure of the signal conversion circuit shown in FIG. 18.

Alternatively, in some other embodiments of this application, a structure of the signal conversion circuit 301 may be shown in FIG. 19C, including a diode 311, a second energy storage circuit 321, and a logic control circuit 351. A connection manner and a function of the diode 311 are the same as those described above, and details are not described herein again.

An input end k1 of the logic control circuit 351 is electrically connected to the output end of the diode 311 and the second energy storage circuit 321, and an output end k2 is electrically connected to the control end g1 of the first switch circuit 303 and the control end g2 of the second switch circuit 304 that are shown in FIG. 18. In addition, as shown in FIG. 19C, a logic control end k3 of the logic control circuit 351 is electrically connected to a second voltage end VDD 2.

In this case, in the touch detection phase P1, when the touch excitation signal S1 is a high level shown in FIG. 19C, the high level is transmitted to the logic control end k3 of the logic control circuit 351 by using the diode 311, and the logic control end k3 compares a received voltage with a voltage of the second voltage end VDD 2. In this case, the voltage (the touch excitation signal S1 is at a high level) received by the logic control end k3 is greater than or equal to the voltage of the second voltage end VDD 2, and the logic control end k3 inputs the high level to the control end g1 of the first switch circuit 303 and the control end g2 of the second switch circuit 304. In addition, the capacitor C and the inductor L1 in the second energy storage circuit 321 may store the high level.

In addition, in a process in which the touch excitation signal S1 decreases from a high level to a low level, the second energy storage circuit 321 may discharge to the logic control end k3 of the logic control circuit 351, so that the logic control end k3 continuously receives the foregoing high level. Therefore, before discharging of the second energy storage circuit 321 ends, the touch excitation signal S1 quickly changes from a low level to a high level, so that the logic control end k3 continues to output a high level. In this way, in the entire touch detection phase P1, the sampling signal S3 remains at a high level.

In addition, the voltage of the second voltage end VDD 2 may be set, so that in the non-touch detection phase P2, when the voltage (the touch excitation signal S1 is at a low level) received by the logic control end k3 of the logic control circuit 351 is less than the voltage of the second voltage end VDD 2, the low level is input to the first switch circuit 303 and the second switch circuit 304. In this case, the sampling signal S3 is at a low level. Therefore, the waveform of the obtained sampling signal S3 is the same as the waveform of the low frequency part of the touch excitation signal S1.

It should be noted that the logic control circuit 351 may be a triple gate, or a circuit structure combined with logic gate circuits such as an AND gate and a NOT gate. A specific structure of the logic control circuit 351 is not limited in this application, provided that it can be ensured that the waveform of the obtained sampling signal S3 is the same as the waveform of the low frequency part of the touch excitation signal S1.

The following describes other circuit structures in the isolation power supply circuit 30 by using examples, for example, the first energy storage circuit 302, the first switch circuit 303, and the second switch circuit 304.

Figure 20:
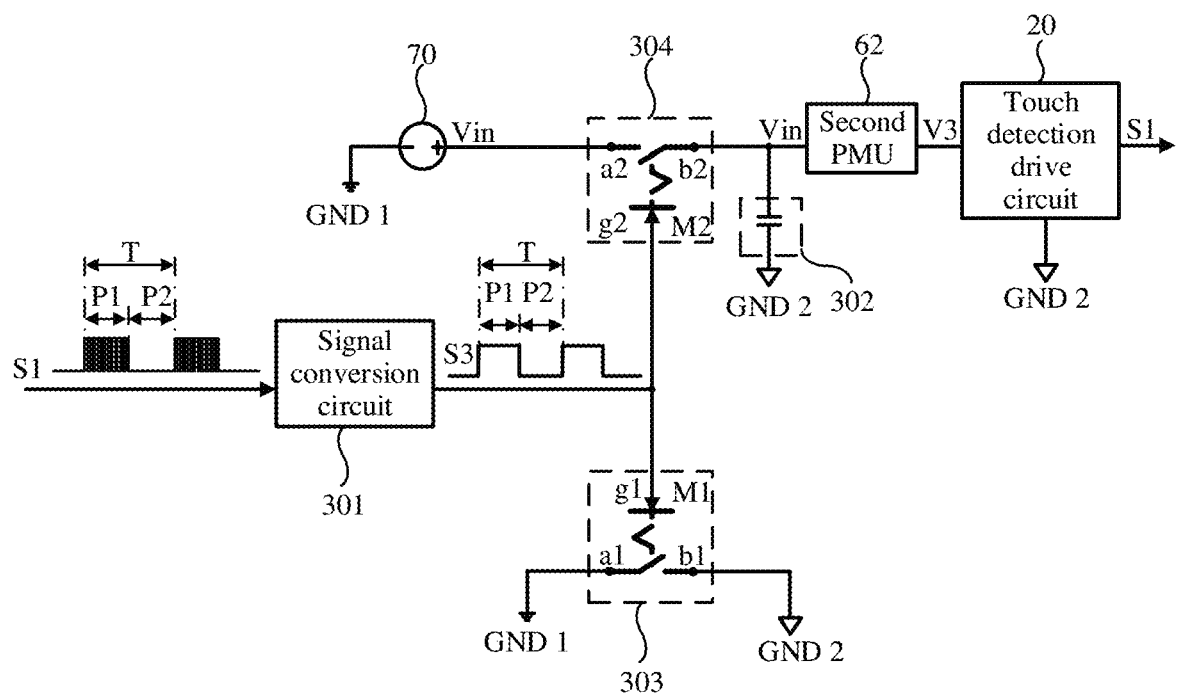
FIG. 20 is a schematic diagram of a structure of another isolation power supply circuit according to an embodiment of this application.

For example, as shown in FIG. 20, both the first switch circuit 303 and the second switch circuit 304 may include a transistor, for example, an MOS transistor. For example, the first switch circuit 303 may include a transistor M1. A control end g1 of the transistor M1 is electrically connected to an output end of the signal conversion circuit 301. A first end a1 of the transistor M1 is electrically connected to the first reference ground GND 1, and a second end b1 is electrically connected to the second reference ground GND 2. In this case, the first switch circuit 303 may be configured to: under control of the sampling signal S3, short-circuit the first reference ground GND 1 and the second reference ground GND 2 in a conducting state in the non-touch detection phase P2, and disconnect the first reference ground GND 1 from the second reference ground GND 2 in a cut-off state in the touch detection phase P1.

The second switch circuit 304 may include a transistor M2. A control end g2 of the transistor M2 is electrically connected to the output end of the signal conversion circuit 301. A first end a2 of the transistor M2 is electrically connected to a power supply 70 for providing the primary power supply voltage Vin, to receive the primary power supply voltage Vin, and a second end b2 is electrically connected to the first energy storage circuit 302. In this case, the second switch circuit 304 is configured to: under control of the sampling signal S3, transmit the received primary power supply voltage Vin to the first energy storage circuit 302 and the touch detection drive circuit 20 in a conducting state in the non-touch detection phase P2, and enable the first energy storage circuit 302 to discharge to the touch detection drive circuit 20 in a cut-off state in the touch detection phase P1.

In some embodiments of this application, the first energy storage circuit 302 may be a capacitor shown in FIG. 20, a battery capable of charging and discharging, or may be a circuit structure in which energy storage and enabling are implemented by using an inductor.

In addition, when the primary power supply voltage Vin is higher than a working voltage V3 of the touch detection drive circuit 20, the electronic device provided in this embodiment of this application may further include a second PMU 62 shown in FIG. 20. The second PMU 62 may be disposed on the second circuit board 102 and is electrically connected between the first energy storage circuit 302 and the touch detection drive circuit 20. The second PMU 62 is configured to convert the primary power supply voltage Vin into the working voltage V3 of the touch detection drive circuit.

Figure 21:
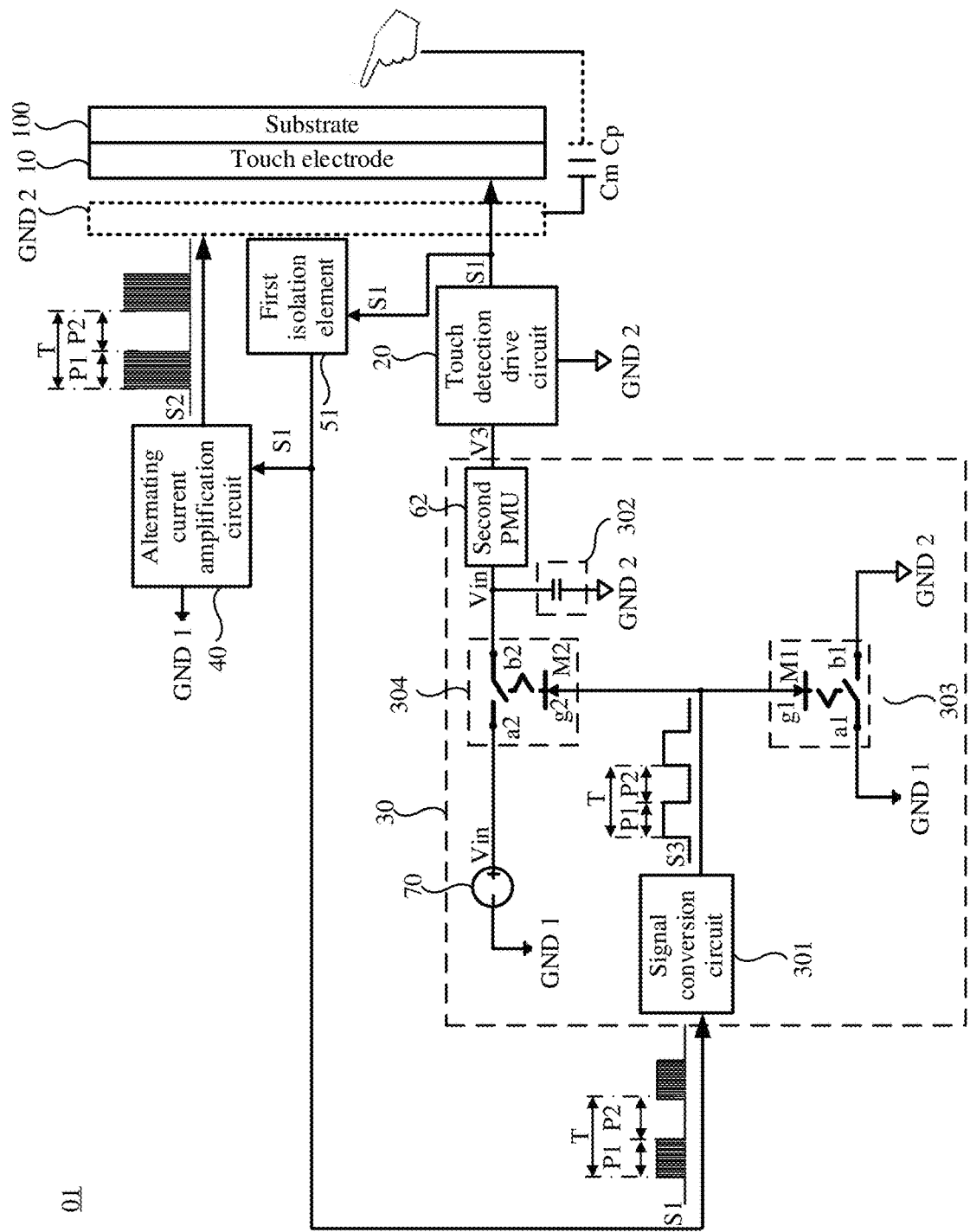
FIG. 21 is a schematic diagram of a structure of another electronic device according to an embodiment of this application.
Figure 22:
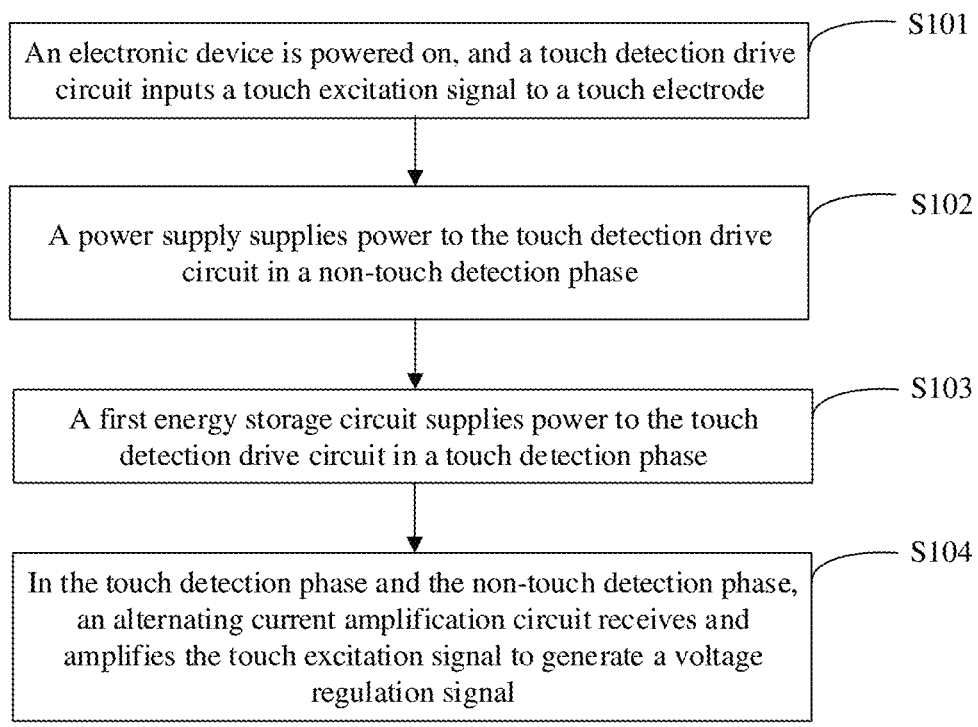
FIG. 22 is a flowchart of a control method for an electronic device according to an embodiment of this application.

A control method for the electronic device 01 shown in FIG. 21 is described in detail by using an example in which the waveform of the sampling signal S3 is the same as the waveform of the low frequency part of the touch excitation signal S1 and both the transistor M1 and the transistor M2 are P-type MOS transistors. The control method may include S101 to S104 shown in FIG. 22.

S101. The electronic device 01 is powered on, and the touch detection drive circuit 20 shown in FIG. 21 inputs the touch excitation signal S1 to the touch electrode 10.

When the electronic device 01 is powered on, an input end of the signal conversion circuit 301 in the isolation power supply circuit 30 may receive a low level, and output the low level, to control the first switch circuit 303 (the transistor M1) and the second switch circuit 304 (M2) to be conducted. The first reference ground GND 1 and the second reference ground GND 2 are short-circuited by using the conducted first switch circuit 303. The power supply 70 for providing the primary power supply voltage Vin is electrically connected to the first energy storage circuit 302 and the second PMU 62 by using the second switch circuit 304. In this case, the first energy storage circuit 302 may perform energy storage. The second PMU 62 may convert the primary power supply voltage Vin into the working voltage V3 of the touch detection drive circuit 20. In this case, the touch detection drive circuit 20 inputs the touch excitation signal S1 to the touch electrode 10. It can be learned from the foregoing that one period T of the touch excitation signal S1 may include the touch detection phase P1 and the non-touch detection phase P2.

In addition, the touch excitation signal S1 output by the touch detection drive circuit 20 may be further transmitted to the alternating current amplification circuit 40 and the input end of the signal conversion circuit 301 in the isolation power supply circuit 30 by using the first isolation element 51.

S102. The power supply 70 supplies power to the touch detection drive circuit 20 in the non-touch detection phase P2.

After the input end of the signal conversion circuit 301 receives the touch excitation signal S1, the touch excitation signal S1 is at a low level in the non-touch detection phase P2. In this case, the sampling signal S3 output by the signal conversion circuit 301 is also at a low level in the non-touch detection phase P2, so that the first switch circuit 303 (the transistor M1) and the second switch circuit 304 (M2) can be controlled to be conducted. As described above, in this case, the first reference ground GND 1 and the second reference ground GND 2 are short-circuited, and the power supply 70 supplies power to the touch detection drive circuit 20 to drive the touch detection drive circuit 20 to output the touch excitation signal S1. In addition, in this phase, the first touch circuit 302 stores an electrical signal that is output by the power supply 70.

S103. The first energy storage circuit 302 supplies power to the touch detection drive circuit 20 in the touch detection phase P1.

After the input end of the signal conversion circuit 301 receives the touch excitation signal S1, the touch excitation signal S1 is at a high level in the touch detection phase P1. In this case, the sampling signal S3 output by the signal conversion circuit 301 is also at a high level in the touch detection phase P1, so that the first switch circuit 303 (the transistor M1) and the second switch circuit 304 (M2) can be controlled to be cut off. In this case, because the first switch circuit 303 is cut off, the first reference ground GND 1 and the second reference ground GND 2 are disconnected. In addition, because the second switch circuit 304 is cut off, the power supply 70 cannot continue to supply power to the touch detection drive circuit 20. In this case, the first touch circuit 302 discharges to the touch detection drive circuit 20, to supply power to the touch detection drive circuit 20, thereby driving the touch detection drive circuit 20 to continue to output the touch excitation signal S1.

S104. In the touch detection phase P1 and the non-touch detection phase P2, the alternating current amplification circuit 40 receives and amplifies the touch excitation signal S1, to generate the voltage regulation signal S2.

As shown in FIG. 21, in the touch detection phase P1 and the non-touch detection phase P2, the touch excitation signal S1 output by the touch detection drive circuit 20 may be transmitted to the alternating current amplification circuit 40 by using the first isolation element 51. The alternating current amplification circuit 40 receives and amplifies the touch excitation signal S1 to generate the voltage regulation signal S2, and transmits the voltage regulation signal S2 to the second reference ground GND 2. A peak-to-peak value (for example, 20 V) of the voltage regulation signal S2 is greater than a voltage value (for example, 0 V) of the first reference ground GND 1.

In this case, for example, the peak-to-peak value of the touch excitation signal S1 is 3.3 V. In the touch detection phase P1, it can be learned from the foregoing that because a voltage difference between the touch electrode 10 and the second reference ground GND 2 remains unchanged (that is, a capacitance value of the parasitic capacitor Cm remains unchanged), a maximum value of a voltage on the touch electrode 10 is 23.3 V. In this case, when the finger performs hovering touch, the foregoing equivalent capacitor Cp is formed between the finger equivalent to the first reference ground GND 1 (for example, 0 V) and the touch electrode 10. A voltage difference between two electrode plates (the finger and the touch electrode 10) of the equivalent capacitor Cp may be 23.3 V. It can be learned from the foregoing that an electrical signal for detecting a charge/discharge time of the equivalent capacitor Cp is amplified, and a voltage difference between two electrode plates (the touch electrode 10 and the second reference ground GND 2) of the parasitic capacitor Cm is relatively small, that is, 3.3 V. Therefore, a signal-to-noise ratio of touch detection can be increased, thereby facilitating implementation of hovering touch.

In view of the above, according to the electronic device 01 provided in this application, the touch detection drive circuit 20 may be isolated from the power supply 70 and the first reference ground GND 1 by using the isolation power supply circuit 30 in the touch detection phase P1, and is electrically connected to the second reference ground GND 2 whose voltage is raised by the alternating current amplification circuit 40. In addition, the isolation power supply circuit 30 may further supply power to the touch detection drive circuit 20 electrically connected to the second reference ground GND 2, so that the touch detection drive circuit 20 remains in a working state. In this way, in a process in which the isolation power supply circuit 30 performs power supply isolation on the touch detection drive circuit 20, the touch detection drive circuit 20 directly obtains, by using the second PMU 62, electric energy from the electrical signal stored in the isolation power supply circuit 30. Therefore, compared with a solution in which the transformer is used to perform power supply isolation on the touch detection drive circuit 20, the direct power supply solution can not only improve power supply efficiency, but also can prevent a coil in the transformer from occupying relatively large space, thereby facilitating application on small electronic devices such as a mobile phone, a tablet, and an intelligent wearable product.

It should be noted that the foregoing describes the control method for the electronic device 01 in detail by using an example in which the waveform of the sampling signal S3 is the same as the waveform of the low frequency part of the touch excitation signal S1 and both the transistor M1 and the transistor M2 are P-type MOS transistors. When the waveform of the sampling signal S3 is opposite to the waveform of the low frequency part of the touch excitation signal S1, both the transistor M1 and the transistor M2 may be N-type MOS transistors. The control method for the electronic device 01 may be obtained in the same way, and details are not described herein again.

An embodiment of this application provides a hovering touch control module. The hovering touch control module is configured to: if there is a specific distance between a finger and a touch electrode, detect a variation of a capacitor formed between the finger and the touch electrode. The hovering touch control module may include a chip system. The chip system may be a structure packaged by a single bare chip. Alternatively, the chip system may be a structure packaged by a plurality of bare chips.

The chip system may include a first reference ground GND 1, a second reference ground GND 2, a touch detection drive module, an isolation power supply module, and an alternating current amplification module. When the chip system is a structure packaged by a single bare chip, the first reference ground GND 1, the second reference ground GND 2, the touch detection drive module, the isolation power supply module, and the alternating current amplification module may be integrated into a same bare chip. Alternatively, when the chip system is a structure packaged by a plurality of bare chips, the first reference ground GND 1, the second reference ground GND 2, the touch detection drive module, the isolation power supply module, and the alternating current amplification module may be integrated into different bare chips in a same chip package structure.

The touch detection drive module is electrically connected to the touch electrode 10 and the second reference ground GND 2. The touch detection drive module is configured to input a touch excitation signal S1 to the touch electrode 10 and receive a detection signal of the touch electrode 10 in a sampling period T. The touch excitation signal S1 includes a touch detection phase P1 and a non-touch detection phase P2 in the sampling period T. The function of the touch detection drive module may be implemented by using the foregoing touch detection drive circuit 20.

The isolation power supply module is electrically connected to the touch detection drive module, the first reference ground GND 1, and the second reference ground GND 2. The isolation power supply module is configured to: receive the touch excitation signal S1 and a primary power supply voltage Vin; based on the touch excitation signal S1 in the non-touch detection phase P2, short-circuit the first reference ground GND 1 and the second reference ground GND 2, store the primary power supply voltage Vin, and transmit the primary power supply voltage Vin to the touch detection drive module. In addition, in the touch detection phase P1, the first reference ground GND 1 is disconnected from the second reference ground GND 2, and discharging to the touch detection drive module is performed. The function of the isolation power supply module may be implemented by using the foregoing isolation power supply circuit 30.

The alternating current amplification module is electrically connected to the first reference ground GND 1 and the second reference ground GND 2. The alternating current amplification module is configured to: receive and amplify the touch excitation signal S1 to generate a voltage regulation signal S2, and transmit the voltage regulation signal S2 to the second reference ground GND 2. A peak-to-peak value of the voltage regulation signal S2 is greater than a voltage value of the first reference ground GND 1. The function of the alternating current amplification module may be implemented by using the foregoing alternating current amplification circuit 40.

In addition, the isolation power supply module includes a signal conversion module, a first energy storage module, a first switch module, and a second switch module. The signal conversion module is configured to: receive the touch excitation signal S1, and filter out a high frequency signal in the touch phase in the touch excitation signal S1 to generate a sampling signal S3. The function of the signal conversion module may be implemented by using the foregoing signal conversion circuit 301.

The first energy storage module is electrically connected to the touch detection drive module. The first energy storage module is configured to store the primary power supply voltage Vin in the non-touch phase P2. In addition, in the touch detection phase P1, discharging to the touch detection drive module is performed. The function of the first energy storage module may be implemented by using the foregoing first energy storage circuit 302. A control end of the first switch module is electrically connected to the signal conversion module, a first end of the first switch module is electrically connected to the first reference ground GND 1, and a second end of the first switch module is electrically connected to the second reference ground GND 2. The first switch module is configured to: under control of the sampling signal S3, short-circuit the first reference ground GND 1 and the second reference ground GND 2 in a conducting state in the non-touch detection phase P2, and disconnect the first reference ground GND 1 from the second reference ground GND 2 in a cut-off state in the touch detection phase P1. The function of the first switch module may be implemented by using the foregoing first switch circuit 303.

A control end of the second switch module is electrically connected to the signal conversion module, a first end of the second switch module is configured to receive the primary power supply voltage Vin, and a second end of the second switch module is electrically connected to the first energy storage module. The second switch module is configured to: under control of the sampling signal S3, transmit the received primary power supply voltage Vin to the first energy storage module and the touch detection drive module in a conducting state in the non-touch detection phase P2, and enable the first energy storage module to discharge in a cut-off state in the touch detection phase P1. The function of the second switch module may be implemented by using the foregoing second switch circuit 304.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An electronic device, comprising:
   a touch electrode;
   a first reference ground and a second reference ground;
   a touch detection drive circuit, electrically connected to the touch electrode and the second reference ground, and configured to:
      in a sampling period, input a touch excitation signal to the touch electrode, wherein the sampling period comprises a touch detection phase and a non-touch detection phase; and
      receive a detection signal of the touch electrode;
   an isolation power supply circuit, electrically connected to the touch detection drive circuit, the first reference ground, and the second reference ground, and comprising:
      a signal conversion circuit, configured to: receive the touch excitation signal, and filter out a high frequency signal in the touch detection phase in the touch excitation signal to generate a sampling signal;
      a first energy storage circuit, electrically connected to the touch detection drive circuit and configured to: store a primary power supply voltage in the non-touch detection phase, and discharge to the touch detection drive circuit in the touch detection phase;
      a first switch circuit, wherein a control end of the first switch circuit is electrically connected to the signal conversion circuit, a first end of the first switch circuit is electrically connected to the first reference ground, and a second end of the first switch circuit is electrically connected to the second reference ground, and the first switch circuit is configured to: under control of the sampling signal, short-circuit the first reference ground and the second reference ground in a conducting state in the non-touch detection phase, and disconnect the first reference ground from the second reference ground in a cut-off state in the touch detection phase; and a second switch circuit, wherein a control end of the second switch circuit is electrically connected to the signal conversion circuit, a first end of the second switch circuit is configured to receive the primary power supply voltage, and a second end of the second switch circuit is electrically connected to the first energy storage circuit, and the second switch circuit is configured to: under control of the sampling signal, transmit the received primary power supply voltage to the first energy storage circuit and the touch detection drive circuit in the conducting state in the non-touch detection phase, and enable the first energy storage circuit to discharge in the cut-off state in the touch detection phase; and an alternating current amplification circuit, electrically connected to the second reference ground and the first reference ground, and configured to:

receive and amplify the touch excitation signal to generate a voltage regulation signal, and transmit the voltage regulation signal to the second reference ground, wherein a peak-to-peak value of the voltage regulation signal is greater than a voltage value of the first reference ground.

2. The electronic device of claim 1, wherein the signal conversion circuit comprises:

a diode, wherein an input end of the diode is configured to receive the touch excitation signal;

a second energy storage circuit, electrically connected to an output end of the diode and the first reference ground; and a third switch circuit, wherein a control end of the third switch circuit is electrically connected to the output end of the diode and the second energy storage circuit, a first end of the third switch circuit is electrically connected to the first reference ground, and a second end of the third switch circuit is electrically connected to a first voltage end, the control end of the first switch circuit, and the control end of the second switch circuit, and the third switch circuit is configured to: disconnect the control end of the first switch circuit and the control end of the second switch circuit from the first reference ground and transmit a voltage of the first voltage end to the control end of the first switch circuit and the control end of the second switch circuit in a cut-off state in the non-touch detection phase, and short-circuit the control end of the first switch circuit and the control end of the second switch circuit to the first reference ground in a conducting state in the touch detection phase.

3. The electronic device of claim 2, wherein the signal conversion circuit further comprises:

a phase inverter, electrically connected between the second end of the third switch circuit and the control end of the first switch circuit and between the second end of the third switch circuit and the control end of the second switch circuit.

4. The electronic device of claim 1, wherein the signal conversion circuit comprises:

a diode, wherein an input end of the diode is configured to receive the touch excitation signal;

a second energy storage circuit, electrically connected to an output end of the diode and the first reference ground; and a logic control circuit, wherein an input end of the logic control circuit is electrically connected to the output end of the diode and the second energy storage circuit, an output end of the logic control circuit is electrically connected to the control end of the first switch circuit and the control end of the second switch circuit, and a logic control end of the logic control circuit is electrically connected to a second voltage end; and wherein in the non-touch detection phase, a voltage received by the logic control circuit is less than a voltage of the second voltage end, and the logic control circuit is configured to input a low level to the first switch circuit and the second switch circuit; and in the touch detection phase, a voltage received by the logic control circuit is greater than or equal to a voltage of the second voltage end, and the logic control circuit is configured to input a high level to the first switch circuit and the second switch circuit.

5. The electronic device of claim 1, wherein the first energy storage circuit comprises a battery, or comprises at least one of a capacitor or an inductor.

6. The electronic device of claim 1, further comprising:

a first isolation element, coupled between the touch detection drive circuit and the alternating current amplification circuit and between the touch detection drive circuit and the isolation power supply circuit, and configured to couple the touch excitation signal to the alternating current amplification circuit and the isolation power supply circuit.

7. The electronic device of claim 6, wherein the first isolation element comprises:

a light emitting device, electrically connected to the touch detection drive circuit and configured to convert the touch excitation signal from the touch detection drive circuit into an optical signal; and an optical-to-electrical converter, electrically connected to the alternating current amplification circuit and the isolation power supply circuit and configured to convert the optical signal into an electrical signal and transmit the electrical signal to the alternating current amplification circuit.

8. The electronic device of claim 6, wherein the first isolation element comprises:

a signal input interface, electrically connected to the touch detection drive circuit and configured to receive the touch excitation signal from the touch detection drive circuit;

a signal output interface, electrically connected to the alternating current amplification circuit and the isolation power supply circuit; and an isolation capacitor, wherein a first end of the isolation capacitor is electrically connected to the signal input interface, and a second end of the isolation capacitor is electrically connected to the signal output interface, and the isolation capacitor is configured to transmit the touch excitation signal from the signal input interface to the signal output interface.

9. The electronic device of claim 6, wherein the first isolation element comprises:

an acoustic device, electrically connected to the touch detection drive circuit and configured to convert the touch excitation signal from the touch detection drive circuit into a sound signal; and an acoustic-to-electric converter, electrically connected to the alternating current amplification circuit and the isolation power supply circuit and configured to convert the sound signal into an electrical signal and transmit the electrical signal to the alternating current amplification circuit.

10. The electronic device of claim 1, wherein the alternating current amplification circuit comprises:
an operational amplifier, wherein an output end of the operational amplifier is electrically connected to the second reference ground, and a control end of the operational amplifier is electrically connected to a voltage control end;
a first capacitor, wherein a first end of the first capacitor is electrically connected to the touch detection drive circuit, and a second end of the first capacitor is electrically connected to a positive input end of the operational amplifier;
a first resistor, wherein a first end of the first resistor is electrically connected to a negative input end of the operational amplifier;
a second capacitor, wherein a first end of the second capacitor is electrically connected to a second end of the first resistor, and a second end of the second capacitor is electrically connected to the first reference ground; and
a second resistor, wherein a first end of the second resistor is electrically connected to the negative input end of the operational amplifier, and a second end of the second resistor is electrically connected to the output end of the operational amplifier.

11. The electronic device of claim 10, wherein the alternating current amplification circuit further comprises:
a third resistor, wherein a first end of the third resistor is electrically connected to the voltage control end, and a second end of the third resistor is electrically connected to the positive input end of the operational amplifier; and
a fourth resistor, wherein a first end of the fourth resistor is electrically connected to the positive input end of the operational amplifier, and a second end of the fourth resistor is electrically connected to the first reference ground, and wherein a resistance value of the third resistor is the same as that of the fourth resistor.

12. The electronic device of claim 1, further comprising:
a processor, electrically connected to the first reference ground; and
a second isolation element, coupled between the processor and the touch detection drive circuit and configured to: couple, to the touch detection drive circuit, a control signal that is output by the processor, and couple a touch detection result obtained by the touch detection drive circuit to the processor.

13. The electronic device of claim 1, further comprising:
a battery;
a first power management circuit, electrically connected to the battery and the first end of the second switch circuit and configured to convert a battery voltage of the battery into the primary power supply voltage; and
a second power management circuit, electrically connected between the first energy storage circuit and the touch detection drive circuit and configured to convert the primary power supply voltage into a working voltage of the touch detection drive circuit.

14. The electronic device of claim 1, further comprising:
a first circuit board, wherein the second reference ground is disposed in the first circuit board, and the touch detection drive circuit is disposed on the first circuit board; and
a second circuit board, wherein the first reference ground is disposed in the second circuit board, and the isolation power supply circuit and the alternating current amplification circuit are disposed on the second circuit board.

15. The electronic device of claim 1, further comprising:
a first circuit board, wherein the second reference ground is disposed in the first circuit board, and the touch detection drive circuit and the isolation power supply circuit are disposed on the first circuit board; and
a second circuit board, wherein the first reference ground is disposed in the second circuit board, and the alternating current amplification circuit is disposed on the second circuit board.

16. The electronic device of claim 14, wherein:
the touch electrode is in a block shape and is a self-capacitance electrode;
the electronic device further comprises a cover, and the cover and the first circuit board are stacked; and
the first circuit board comprises first copper foil facing the cover, the first copper foil comprises a plurality of self-capacitance electrodes, the self-capacitance electrodes are connected to the cover, and the touch detection drive circuit is disposed on a side surface that is of the first circuit board and that faces away from the cover.

17. The electronic device of claim 14, wherein
the touch electrode is a self-capacitance electrode;
the electronic device further comprises a cover and a first display, and the self-capacitance electrode is located between the cover and an out-light surface of the first display; and
a material of the touch electrode comprises a transparent conductive material.

18. A control method for an electronic device, wherein the electronic device comprises a touch electrode, a touch detection drive circuit, an isolation power supply circuit, an alternating current amplification circuit, a first reference ground, and a second reference ground, wherein the touch detection drive circuit is electrically connected to the touch electrode, the isolation power supply circuit is electrically connected to the touch detection drive circuit, the first reference ground, and the second reference ground, and the alternating current amplification circuit is electrically connected to the touch detection drive circuit, the first reference ground, and the second reference ground;
wherein the isolation power supply circuit comprises:
a signal conversion circuit
a first energy storage circuit, electrically connected to the touch detection drive circuit;
a first switch circuit, wherein a control end of the first switch circuit is electrically connected to the signal conversion circuit, a first end of the first switch circuit is electrically connected to the first reference ground, and a second end of the first switch circuit is electrically connected to the second reference ground;
a second switch circuit, wherein a control end of the second switch circuit is electrically connected to the signal conversion circuit, a first end of the second switch circuit is configured to receive a primary power supply voltage, and a second end of the second switch circuit is electrically connected to the first energy storage circuit; and wherein the control method comprises:

inputting, by the touch detection drive circuit in a sampling period, a touch excitation signal to the touch electrode, and receiving a detection signal of the touch electrode, wherein the sampling period comprises a touch detection phase and a non-touch detection phase in the sampling period;

receiving and amplifying, by the alternating current amplification circuit, the touch excitation signal to generate a voltage regulation signal, and transmitting the voltage regulation signal to the second reference ground, wherein a peak-to-peak value of the voltage regulation signal is greater than a voltage value of the first reference ground;

receiving, by the signal conversion circuit, the touch excitation signal, and filtering out a high frequency signal in the touch detection phase in the touch excitation signal to generate a sampling signal;

storing, by the first energy storage circuit, the primary power supply voltage in the non-touch detection phase, and discharging to the touch detection drive circuit in the touch detection phase;

under control of the sampling signal, short-circuiting, by the first switch circuit, the first reference ground and the second reference ground in a conducting state in the non-touch detection phase, and disconnecting the first reference ground from the second reference ground in a cut-off state in the touch detection phase; and under control of the sampling signal, transmitting, by the second switch circuit, the received primary power supply voltage to the first energy storage circuit and the touch detection drive circuit in the conducting state in the non-touch detection phase, and enabling the first energy storage circuit to discharge in the cut-off state in the touch detection phase.

19. A chip system, comprising:

a first reference ground and a second reference ground;

a touch detection drive module, electrically connected to a touch electrode and the second reference ground and configured to: in a sampling period, input a touch excitation signal to the touch electrode and receive a detection signal of the touch electrode, wherein the sampling period comprises a touch detection phase and a non-touch detection phase in the sampling period;

an isolation power supply module, electrically connected to the touch detection drive module, the first reference ground, and the second reference ground and configured to: receive the touch excitation signal and a primary power supply voltage; based on the touch excitation signal in the non-touch detection phase, directly connect the first reference ground and the second reference ground, store the primary power supply voltage, and transmit the primary power supply voltage to the touch detection drive module; and in the touch detection phase, disconnect the first reference ground from the second reference ground from being directly connected and discharge to the touch detection drive module, wherein the isolation power supply module comprises:

a signal conversion circuit, configured to: receive the touch excitation signal, and filter out a high frequency signal in the touch detection phase in the touch excitation signal to generate a sampling signal;

a first energy storage circuit, electrically connected to the touch detection drive module and configured to: store the primary power supply voltage in the non-touch detection phase, and discharge to the touch detection drive module in the touch detection phase;

a first switch circuit, wherein a control end of the first switch circuit is electrically connected to the signal conversion circuit, a first end of the first switch circuit is electrically connected to the first reference ground, and a second end of the first switch circuit is electrically connected to the second reference ground, and the first switch circuit is configured to: under control of the sampling signal, short-circuit the first reference ground and the second reference ground in a conducting state in the non-touch detection phase, and disconnect the first reference ground from the second reference ground in a cut-off state in the touch detection phase;

a second switch circuit, wherein a control end of the second switch circuit is electrically connected to the signal conversion circuit, a first end of the second switch circuit is configured to receive the primary power supply voltage, and a second end of the second switch circuit is electrically connected to the first energy storage circuit, and the second switch circuit is configured to: under control of the sampling signal, transmit the received primary power supply voltage to the first energy storage circuit and the touch detection drive module in the conducting state in the non-touch detection phase, and enable the first energy storage circuit to discharge in the cut-off state in the touch detection phase; and an alternating current amplification module, electrically connected to the second reference ground and the first reference ground and configured to: receive and amplify the touch excitation signal to generate a voltage regulation signal, and transmit the voltage regulation signal to the second reference ground, wherein a peak-to-peak value of the voltage regulation signal is greater than a voltage value of the first reference ground.

* * * * *